US012763532B2

(12) United States Patent
Garrison et al.

(10) Patent No.: US 12,763,532 B2
(45) Date of Patent: Oct. 13, 2026

(54) RF CONNECTOR MOUNTING

(71) Applicant: Samtec, Inc., New Albany, IN (US)

(72) Inventors: Kelly F. Garrison, New Albany, IN (US); Thomas A. Hall, III, New Albany, IN (US); Daniel R. Birch, New Albany, IN (US); Jonathan E. Buck, New Albany, IN (US); Chadrick P. Faith, New Albany, IN (US); Christopher W. Shelly, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 323 days.

(21) Appl. No.: 18/292,060

(22) PCT Filed: Sep. 22, 2022

(86) PCT No.: PCT/US2022/044414
§ 371 (c)(1),
(2) Date: Jan. 25, 2024

(87) PCT Pub. No.: WO2023/049281
PCT Pub. Date: Mar. 30, 2023

(65) Prior Publication Data

US 2024/0339791 A1 Oct. 10, 2024

Related U.S. Application Data

(60) Provisional application No. 63/359,448, filed on Jul. 8, 2022, provisional application No. 63/256,878, filed
(Continued)

(51) Int. Cl.
*H01R 24/50* (2011.01)
*H01R 103/00* (2006.01)

(52) U.S. Cl.
CPC ......... *H01R 24/50* (2013.01); *H01R 2103/00* (2013.01)

(58) Field of Classification Search
CPC H01R 24/50; H01R 2103/00; H01R 12/7052; H01R 24/44; H01R 13/2464
See application file for complete search history.

(56) References Cited

U.S. PATENT DOCUMENTS 4,964,805 A * 10/1990 Gabany .................. H01R 24/50 439/434
5,411,409 A * 5/1995 Gray ...................... H01R 24/50 439/63

(Continued)

FOREIGN PATENT DOCUMENTS

| | | |
|---|---|---|
| CN | 301056981 | 11/2009 |
| KR | 10-1708341 B1 | 2/2017 |
| WO | 00/04604 A1 | 1/2000 |

OTHER PUBLICATIONS

Official Communication issued in International Patent Application No. PCT/US2022/044414, mailed on Mar. 16, 2023.

*Primary Examiner* — Edwin A. Leon
(74) *Attorney, Agent, or Firm* — Keating & Bennett, LLP

(57) ABSTRACT

An electrical connector includes a housing and an aligner. The aligner is defined by a connector base of the housing or by an alignment peg. The aligner defined by the connector base is configured to cooperate with a corresponding fiducial to properly align the electrical connector on a mounting surface of a substrate. The aligner defined by an alignment peg includes a main body and an embossed portion that defines a protrusion that extends from the main body. The embossed portion is configured to mate with a raised or recessed portion of a substrate to properly locate and align the electrical connector to the substrate.

21 Claims, 34 Drawing Sheets

Related U.S. Application Data on Oct. 18, 2021, provisional application No. 63/247,237, filed on Sep. 22, 2021.

(56) References Cited

U.S. PATENT DOCUMENTS

| | | | | |
|---|---|---|---|---|
| 5,860,812 | A * | 1/1999 | Gugliotti ................ | H01R 24/50 439/931 |
| 9,553,376 | B1 * | 1/2017 | Tsironis ............... | G01R 1/0416 |
| 2005/0007132 | A1 | 1/2005 | Richmond, II et al. | |
| 2006/0240699 | A1 | 10/2006 | Harper, Jr. | |
| 2013/0056255 | A1 | 3/2013 | Biddle et al. | |
| 2020/0220286 | A1 | 7/2020 | Bettman et al. | |

* cited by examiner

RF CONNECTOR MOUNTING

CROSS REFERENCE TO RELATED APPLICATIONS

This application claims the benefit of U.S. Patent Application No. 63/247,237, filed on Sep. 22, 2021; U.S. Patent Application No. 63/256,878, filed on Oct. 18, 2021; and U.S. Patent Application 63/359,448, filed on Jul. 8, 2022. The entire contents of each application are hereby incorporated by reference.

BACKGROUND OF THE INVENTION

1. Field of the Invention

The present invention generally relates to mounting of radio-frequency (RF) or coaxial-board connectors.

2. Description of the Related Art

As shown in FIGS. 1A-3D, vertically mounted RF compression connectors include a single RF conductor or a first conductor 3PA that includes or defines a compression end 5PA. The compression end 5PA compresses onto a corresponding signal trace pad 7PA (FIGS. 1A-1F and 2A-2F) of a substrate or mounting substrate or printed circuit board (PCB) (not shown). As shown in FIGS. 1A-1F, the vertically mounted RF compression connector 1PA1 defines a D-shaped or U-shaped or horseshoe shaped grounding ring 9PA. As shown in FIGS. 2A-2F, the vertically mounted RF compression connector 1PA2 defines a circular shaped grounding ring 9APA. As shown in FIGS. 3A-3D, the vertically mounted RF compression connector 1PA3 defines a C-shaped grounding ring 9BPA. The compression end 5PA end can include a pogo pin 11PA. The vertically mounted RF compression connectors 1PA1 and 1PA3, shown respectively in FIGS. 1A-1F and 3A-3F, can further define a signal trace window or trace tunnel or trace cover 13PA that partially circumscribes a signal trace 15PA (FIGS. 1A-1F).

SUMMARY OF THE INVENTION

There can be misalignment between a compression end of a first conductor, such as a single RF conductor, and its corresponding signal trace pad. This misalignment can result in unwanted insertion loss.

One solution is to make the signal trace pad have a larger area so that the compression end of the first conductor includes a larger target to engage.

Another solution is shown in FIG. 4, a compression connector, such as a vertically mounted RF compression connector 1PA1 shown at FIGS. 1A-1F can be mounted onto a substrate, such as a mounting substrate J1. The vertically mounted RF compression connector 1PA1 can be removed from the mounting substrate J1. The mounting substrate J1 can include a ground plane G. The mounting substrate J1 can define an anti-pad AP that can be partially or fully devoid of electrical material and that can form any applicable shape, such as a horseshoe or hairpin. The mounting substrate can also carry a signal trace S, a signal pad P, and one or more substrate fastener holes H. The signal pad P can be formed as part of the signal trace S. The signal pad P can have a dimension larger than the dimension of the signal trace S. For example, the radius of the signal pad P can be larger than the width of the signal trace S.

Ideally, a center of the compression end 5PA (FIGS. 1A-3D) of any one the first conductors 3PA (FIGS. 1A-3D) should lie coincident on a corresponding center of the signal pad P (FIG. 4). However, as shown in FIG. 4, the compression end (5PA in FIGS. 1A-3D) of the first conductor (3PA in FIGS. 1A-3D) missed the signal pad P almost entirely, as shown by the crescent moon shaped impression I that was embossed or imprinted into the signal trace S. Misalignment between the compression end 5PA and the corresponding center of the signal pad P is an unwanted "swing and a miss", and can result in degraded signal integrity performance, include increase insertion loss.

Several technical solutions can be used to help solve the misalignment problem between the compression end of the first conductor and a corresponding signal pad. A first embodiment can include an electrical connector, such as a compression connector or a vertically mounted RF compression connector. The electrical connector can include a connector housing and a first conductor carried by the connector housing. The first conductor can include a compression end. The connector housing can include a connector base. The connector base can define at least one connector fastener hole. The first conductor can be a coaxial or RF compression conductor. The compression end can be formed from the first conductor, can be a pogo pin, can be a separate elastomeric material, or can be a fuzz button. The connector housing can be made from an electrically conductive material. The first conductor can be made from an electrically conductive material.

The connector housing or the connector base can define at least one aligner, other than a connector fastener hole. The at least one aligner can be configured to cooperate with a corresponding fiducial, marking, indicia, dummy trace, anti-pad, slot, divot, or recess to properly align the electrical connector on a mounting surface of a substrate or with respect to a mounting surface of a substrate. The at least one aligner can be an open-ended notch, a closed notch, a recess, a cutout, a through hole, a concavity, a protrusion, or a cavity in the connector base. The at least one aligner can be configured so that the at least one aligner and a corresponding fiducial, marking, indicia, dummy trace, anti-pad, slot, divot, or recess can both be seen visually when the at least one aligner is positioned over the corresponding fiducial, marking, indicia, dummy trace, anti-pad, slot, divot, or recess.

Alternatively, the connector base can define at least two aligners, neither of which is a connector fastener hole. Each of the at least two aligners can be configured to cooperate with a corresponding fiducial, marking, indicia, dummy trace, slot, divot, or recess on a mounting surface of a substrate to properly align the electrical connector on a mounting surface of a substrate or with respect to a mounting surface of a substrate. Each of the at least two aligners can be positioned only on a first side of the connector base, only on a second side of the connector base, or on both the first and second sides of the connector base. Each of the at least two aligners can be an open-ended notch, a closed notch, a recess, a cutout, a hole, a concavity, a protrusion, or a cavity defined in the connector base.

The connector base can define a grounding structure or grounding ring on a second base side of the connector base. The grounding ring can have or define a first material thickness. The first material thickness can be less than a second material thickness of either a second part configured to be positioned on or removably positioned on a substrate or an exposed ground plane positioned on a substrate that is configured to electrically connect, physically connect or both to the grounding structure or grounding ring.

The electrical connector can be configured to be attached, such as compressibly attached, to a substrate. The first material thickness can be less than a second material thickness of either a second part positioned on or removably positioned on the substrate or an exposed ground plane positioned on the substrate.

A vertically mounted RF compression connector can include a connector housing. The connector housing can define a connector base. A first conductor can be carried by the connector housing. The first conductor can include a compression end. The grounding structure or grounding ring can be carried by a second base side of the base. At least one connector fastener hole can be defined by the connector base. At least one aligner can be defined by the connector base or the connector housing, wherein the aligner is not another fastener hole. The compression end can be a pogo pin, an electrically conductive elastomeric material, can be formed from or be part of the first conductor, or can be a fuzz button.

A vertically mounted RF compression connector can include a connector housing that defines a connector base. A first conductor can be carried by the connector housing. The first conductor can include a compression end. A grounding structure or grounding ring can be carried by a second base side of the base. At least one pair of connector fastener holes can be defined by the connector base. At least one aligner can be defined by the connector base or the connector housing. The compression end can be formed from or be part of the first conductor, can be an electrically conductive elastomeric material, can be a pogo pin, or can be a fuzz button.

An aligner can include a first part and a second part removably attached to the first part. The first part can define an alignment fiducial. The alignment fiducial can include a center hole fiducial. The alignment fiducial can include a fastener fiducial.

A substrate can include a substrate mounting side and an exposed ground plane on the substrate mounting side. The exposed ground plane can include a ground plane material thickness. A first anti-pad can electrically separate a signal trace from the ground plane. A second anti-pad can define a radius, an arc length, a portion of a circle, or a non-curved shape. The ground plane can define a ridge wall configured to receive the grounding structure or grounding ring positioned on an electrical connector configured to be mounted to the substrate mounting side.

A waveguide connector can include a connector housing. A first signal antenna can be carried by the connector housing. The first signal antenna can include a compression end. The connector housing includes a connector base. The connector base can define at least one aligner, other than a connector fastener hole, configured to cooperate with a corresponding fiducial to properly align the waveguide connector on a mounting surface of a substrate. The at least one aligner can be any one or more of an open-ended notch, a closed notch, a recess, a cutout, a hole, a concavity, a protrusion, or a cavity in the connector base. The connector base can define at least two aligners, neither of which is a connector fastener hole. Each of the at least two aligners can be configured to cooperate with a corresponding fiducial to properly align the waveguide connector on a mounting surface of a substrate. Each of the at least two aligners can be positioned only on a first side of the connector base, only on a second side of the connector base, or on both the first and second sides of the connector base. Each of the at least two aligners can be any one of an open-ended notch, a closed notch, a recess, a cutout, a hole, a concavity, a protrusion, or a cavity defined in the connector base.

The connector base can include a grounding ring on a second base side of the connector base. The grounding ring can define a first material thickness. The first material thickness can be less than a second material thickness of either a second part configured to be positioned on or removably positioned on a substrate or an exposed ground plane positioned on a substrate that is configured to electrically connect, physically connect or both to the grounding ring.

The waveguide connector can further include a substrate. The first material thickness can be less than a second material thickness of either a second part positioned on or removably positioned on the substrate or an exposed ground plane positioned on the substrate.

The first signal antenna can be a coaxial or RF compression conductor. The compression end can be a separate elastomeric material. The compression end can be a fuzz button. The connector housing can be made from an electrically conductive material. The first conductor can be made from an electrically conductive material. The connector base can define at least one connector fastener hole.

A substrate can include a fiducial, marking, indicium, dummy trace, anti-pad, slot, divot, or recess configured to align a mounting electrical or waveguide connector. The fiducial, marking, indicium, dummy trace, anti-pad, slot, divot, or recess can be dedicated to alignment and can have no function other than alignment. The fiducial, marking, indicium, dummy trace, anti-pad, slot, divot, or recess can have an electrical function in addition to alignment. The fiducial, marking, indicium, dummy trace, anti-pad, slot, divot, or recess can a mechanical function in addition to alignment.

According to another embodiment of the present invention, an alignment peg is provided that is able to be inserted into a RF connector to align a first conductor of the RF connector to a corresponding signal pad.

According to an embodiment of the present invention, an alignment peg for an electrical connector includes a main body and an embossed portion that defines a protrusion from the main body.

The embossed portion can be configured to mate with a raised or recessed portion of a substrate, when the alignment peg is inserted into the electrical connector. The raised or recessed portion of the substrate can include an electrical trace. The raised or recessed portion of the substrate can include a ground plane. The embossed portion can have a semi-circular shape. The embossed portion can include a roughened surface. The main body can have a cylindrical or substantially cylindrical shape. The alignment peg can be a 3D-printed alignment peg. The material of each of the main body and the embossed portion can be made of plastic or a dielectric material. The main body can include a stepped portion. The stepped portion can define two different width diameters in the main body. The stepped portion can be configured to be received by a corresponding mating interface of the electrical connector.

According to an embodiment of the present invention, a method of attaching an electrical connector on a substrate includes the steps of locating the electrical connector on a substrate, inserting an alignment peg into the electrical connector, aligning the electrical connector to the substrate with the alignment peg inserted into the electrical connector, securing the electrical connector to the substrate, and removing the alignment peg.

When the alignment peg is inserted into the electrical connector, a portion of the alignment peg can protrude from the electrical connector. The step of locating the electrical connector on the substrate can include aligning at least one hole of the electrical connector with at least one corresponding hole of the substrate. The step of securing the electrical connector to the substrate can include inserting a fastener through each of the at least one hole of the electrical connector and the at least one corresponding hole of the substrate. The fastener can be a screw. The step of aligning the electrical connector to the substrate can include rotating the alignment peg. The alignment peg can be rotated until an embossed portion of the alignment peg is mated with a raised or recessed portion of the substrate. The raised or recessed portion of the substrate can include an electrical trace. The raised or recessed portion of the substrate can include a ground plane. The embossed portion can include a roughened surface configured to remove oxidation from the raised or recessed portion of the substrate when the alignment peg is rotated.

According to an embodiment of the present invention, an electrical connector includes a connector housing and an electrical conductor that is carried by the connector housing and that includes a probe tip that protrudes from the connector housing.

The probe tip can have a hemispherical shape, a tapered shape, or a pyramidal shape. The electrical conductor can have a stepped or tapered shape with a smallest diameter at the probe tip. The probe tip can be configured to be received by a corresponding contact hole in a mating substrate. At least one of the probe tip and the corresponding contact hole can at least partially deform when the probe tip is received by a corresponding contact hole. At least one of the probe tip and the corresponding contact hole can include a keying feature. The probe tip and the corresponding contact hole can include matching mating geometries.

According to an embodiment of the present invention, a substrate includes a substrate mounting side, a signal trace that is on the substrate mounting side and that includes a contact hole, a ground plane that is exposed and that is on the substrate mounting side, and an anti-pad that electrically separates the signal trace from the ground plane.

The anti-pad can at least partially surround the contact hole to define a portion of the signal trace surrounding the contact hole in a ring shape. The signal trace can include a contact pad, and the contact hole can be located in a center portion of the contact pad. The contact hole can be structed to not fully extend through the substrate.

The above and other features, elements, characteristics, steps, and advantages of the present invention will become more apparent from the following detailed description of the embodiments of the present invention with reference to the attached drawings.

DETAILED DESCRIPTION

Figure 1A:
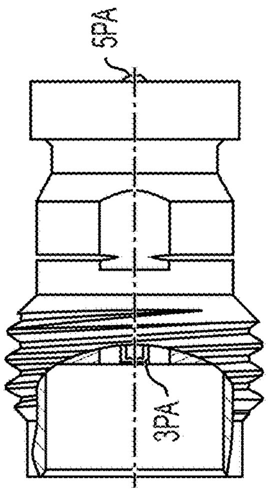
FIG. 1A (PRIOR ART)
FIGS. 1A-1F show a known vertically mounted RF compression connector.
Figure 1B:
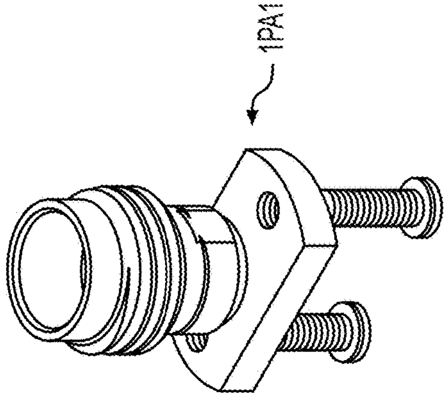
FIG. 1B (PRIOR ART)
Figure 1C:
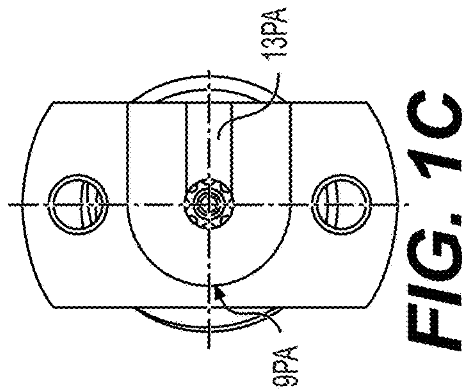
FIG. 1C (PRIOR ART)
Figure 1D:
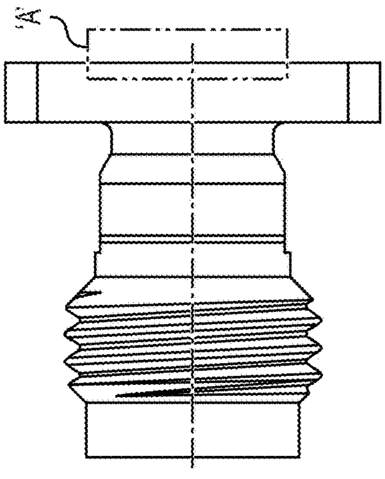
FIG. 1D (PRIOR ART)
Figure 1E:
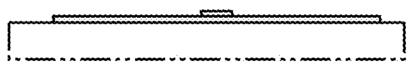
FIG. 1E (PRIOR ART)
Figure 1F:
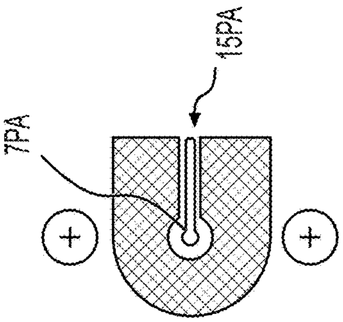
FIG. 1F (PRIOR ART)
Figure 2A:
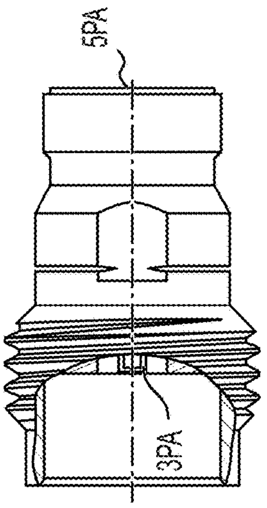
FIG. 2A (PRIOR ART)
FIG. 2A-2F show another known vertically mounted RF compression connector.
Figure 2B:
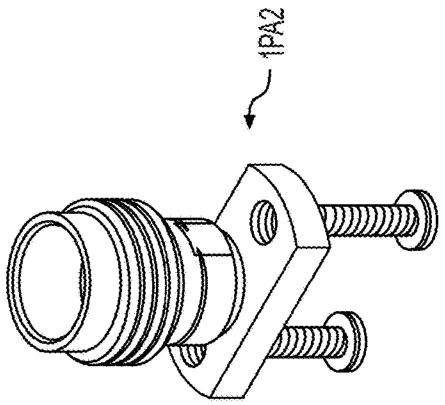
FIG. 2B (PRIOR ART)
Figure 2C:
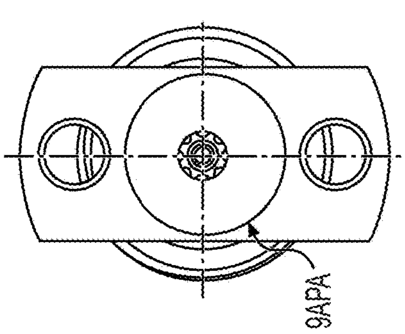
FIG. 2C (PRIOR ART)
Figure 2D:
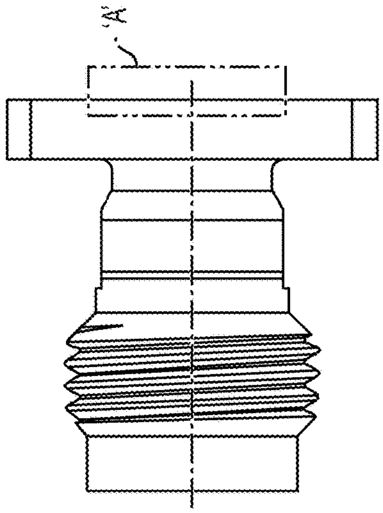
FIG. 2D (PRIOR ART)
Figure 2E:
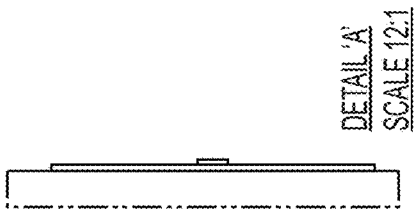
FIG. 2E (PRIOR ART)
Figure 2F:
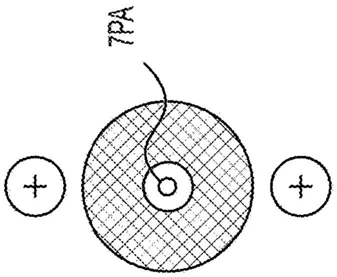
FIG. 2F (PRIOR ART)
Figure 3A:
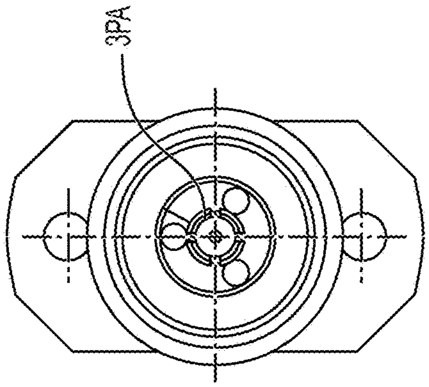
FIG. 3A (PRIOR ART)
FIG. 3A-3D show another known vertically mounted RF compression connector.
Figure 3B:
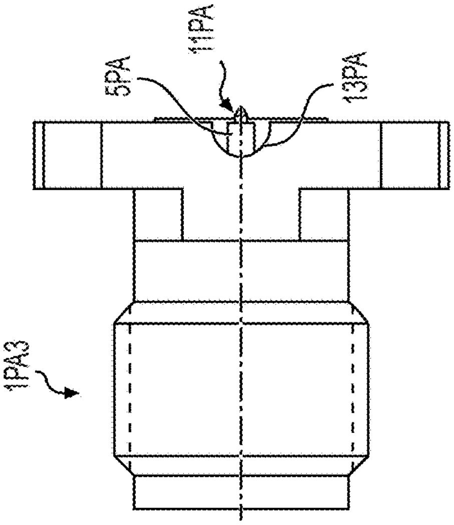
FIG. 3B (PRIOR ART)
Figure 3C:
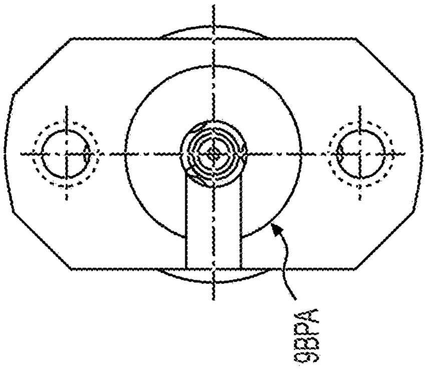
FIG. 3C (PRIOR ART)
Figure 3D:
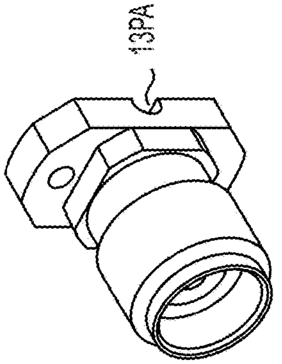
FIG. 3D (PRIOR ART)
Figure 4:
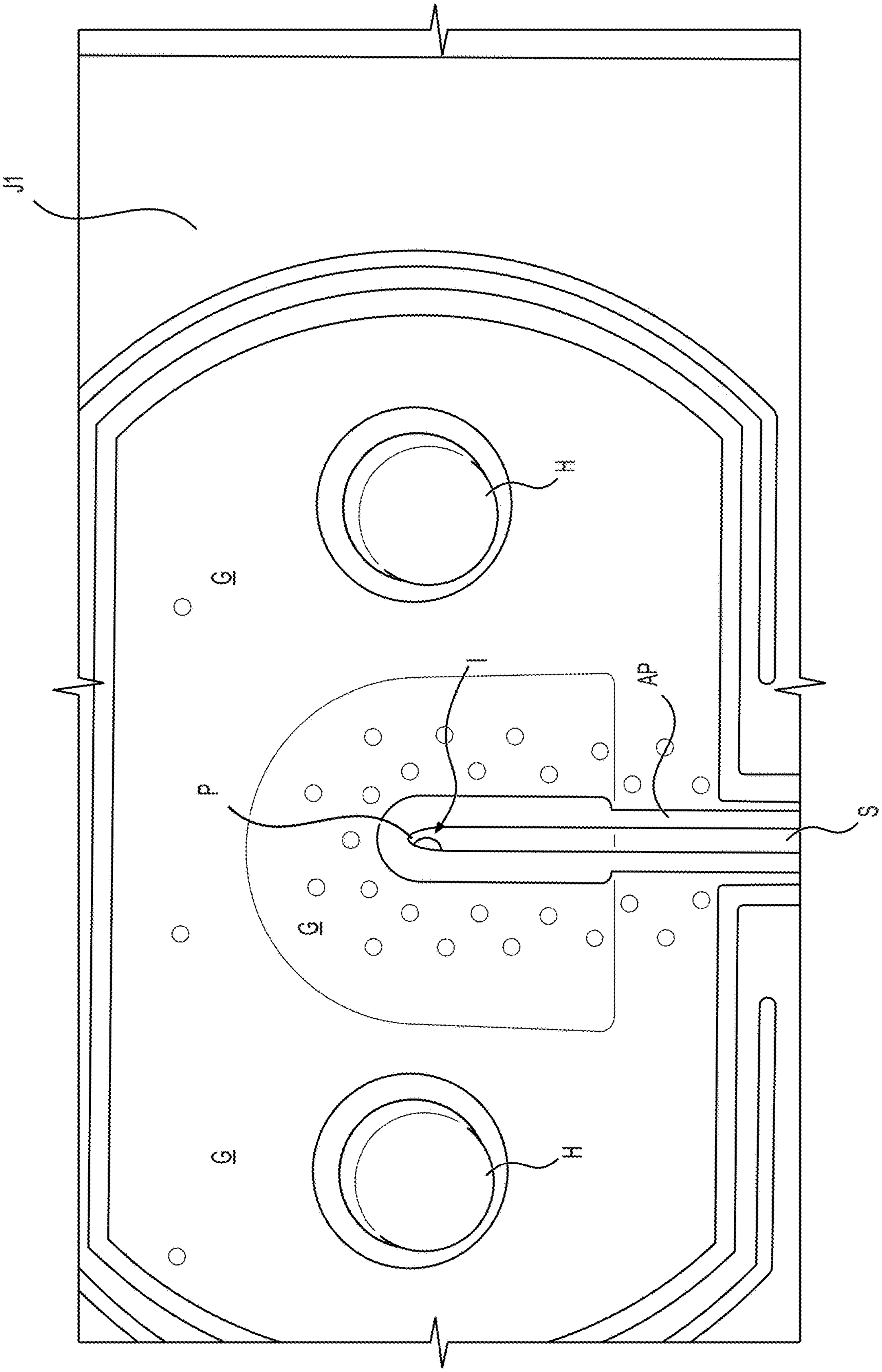
FIG. 4 is a top view of a substrate with a vertical RF launch after a vertically mounted, RF compression connector was compressed onto the substrate and then removed from the substrate.

Any of the vertically mounted, RF compression connectors 1PA1, 1PA2, 1PA3 discussed above with respect to FIGS. 1A-3D are not the claimed invention but can be retrofitted according to the following detailed description to fall with the scope of the claimed invention. Therefore, the vertically mounted, RF compression connectors 1PA1, 1PA2, and 1PA3. Moreover, the mounting substrate J1 shown in FIG. 4 is not the claimed invention but can be retrofitted according to the following detailed description to fall with the scope of the claimed invention.

A vertically mounted, RF compression connector can mean any one or all of 1PA1, 1PA2, 1PA3 or 10. However, reference numeral 10 is also broader in scope because reference numeral 10 also includes any surface mounted or compression electrical or optical connector, not just one of the vertically mounted, RF compression connectors 1PA1, 1PA2, 1PA3 shown in FIGS. 1A-3D. The same is true for single RF conductor 3PA and first conductor 26. Single RF conductor 3PA is expressly limited to vertically mounted, RF compression connectors 1PA1, 1PA2, 1PA3, while first conductor 26 can be any first conductor in any type of electrical connector. Compression end 5PA and first compression end 30 is yet another example. Compression end 5PA is expressly limited to a vertically mounted, RF compression connector. Compression ends 5PA and 30 can both have identical or slightly different structures, but first compression end 30 is expressly not limited to a vertically mounted, RF compression connector. First compression end 30 can also apply to right angle RF compression connectors and waveguide compression connectors, such as right angle or vertical compression, waveguide connectors.

Figure 5:
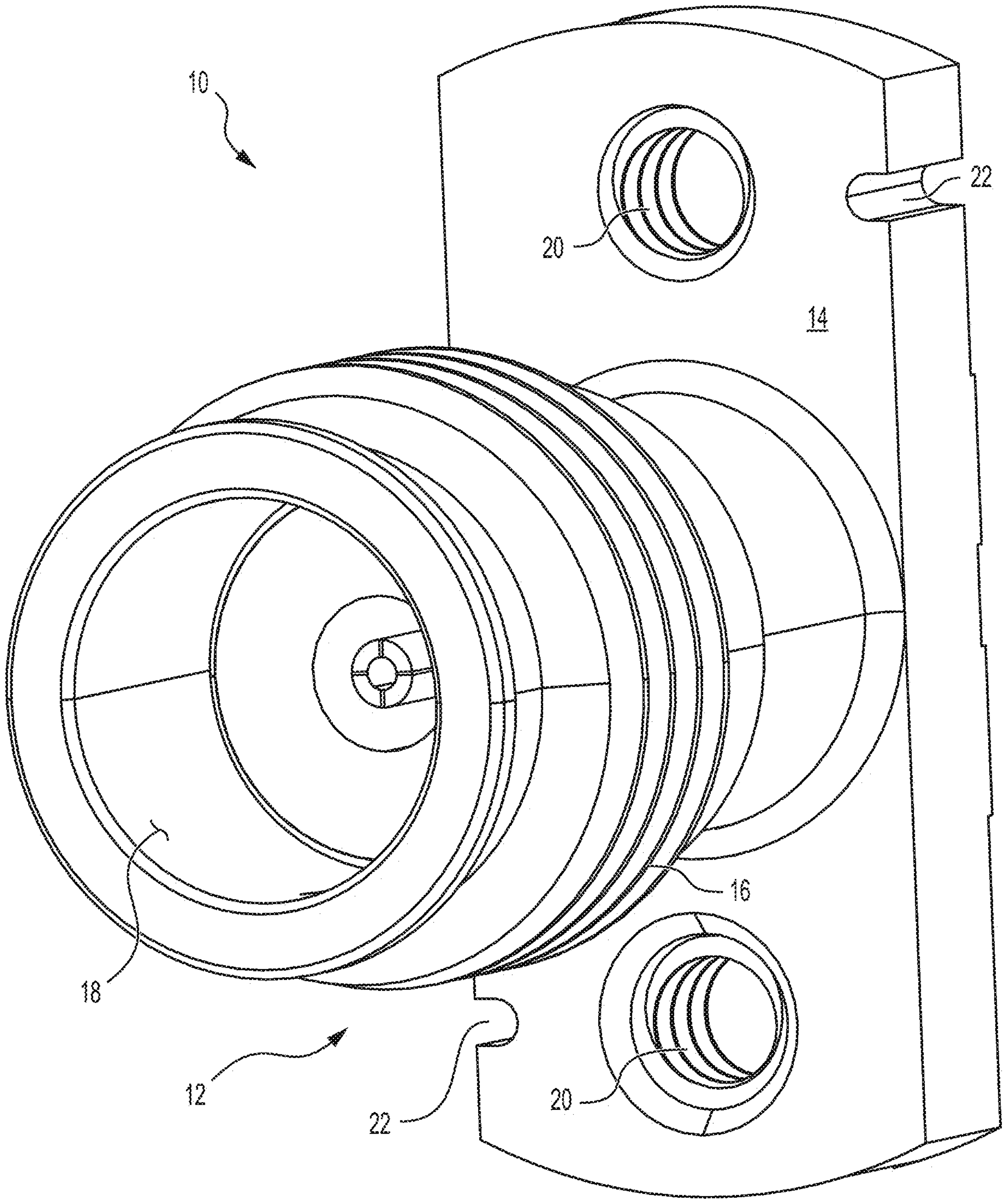
FIG. 5 is a perspective top view of a vertically mounted, RF compression connector with aligners.

FIG. 5 shows an exemplary electrical connector, which can be, but is not limited to, a vertically mounted, RF compression connector 10. The RF compression connector 10 can include a connector housing 12. The connector housing 12 can define a connector base 14. The connector housing 12 and the connector base 14 can be unitary with one another or be formed, machined, or cast as a single body, and can be made from an electrically conductive material, such as metal. The connector housing 12 can define external threads 16 adjacent to at least one port 18 of the RF compression connector 10. At least one or at least two connector fastener holes 20 can be defined by the connector housing 12 or the connector base 14. At least one aligner 22, which can be a structure other than one of the connector fastener holes 20 or the trace cover 13PA shown in FIGS. 3A-3D. The at least one aligner 22 can be defined by any one of the connector housing 12 or the connector base 14. Aligners 22 are discussed in more detail below.

Figure 6:
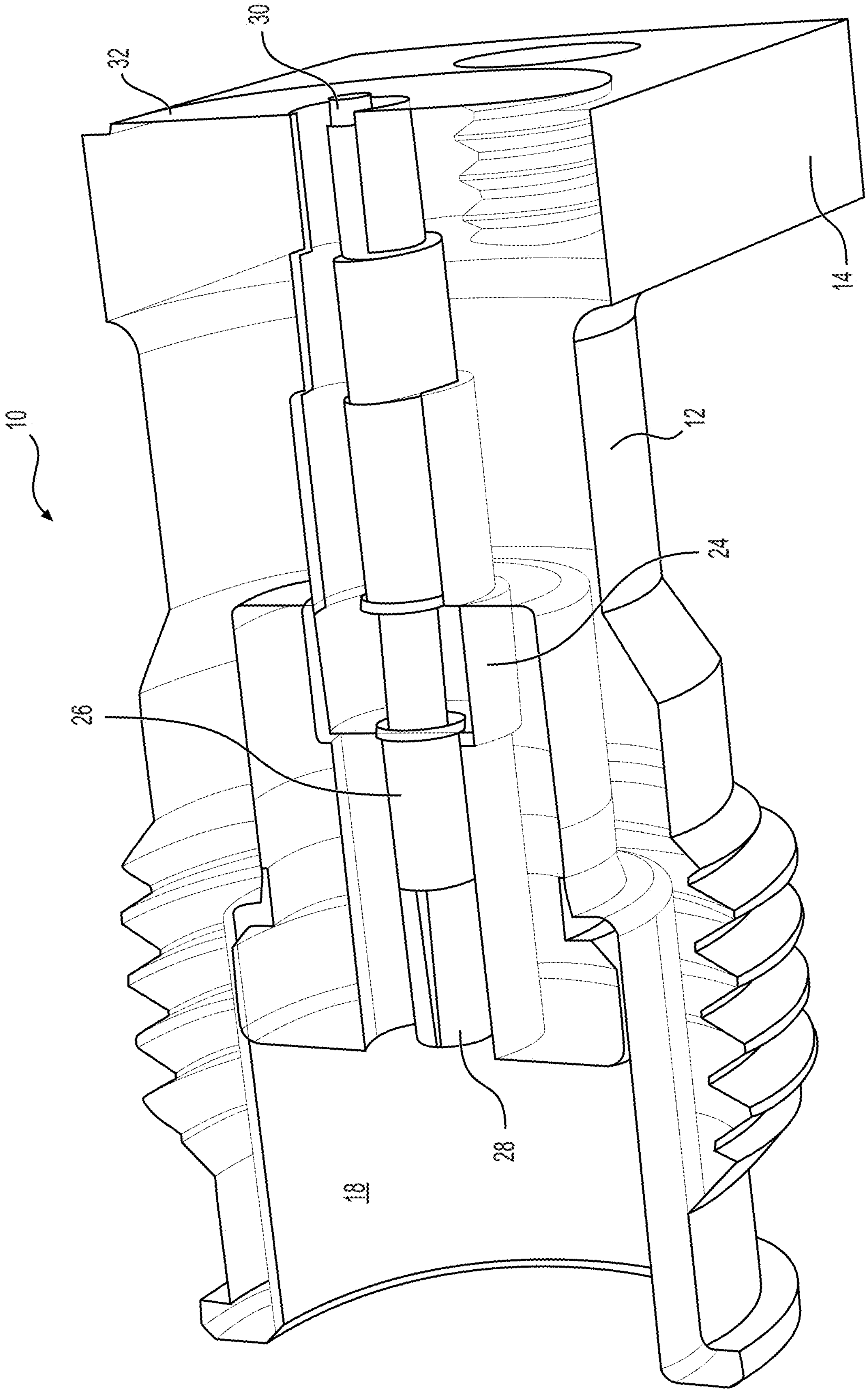
FIG. 6 is a cross-sectional end view of the vertically mounted, RF compression connector shown in FIG. 5.
Figure 7:
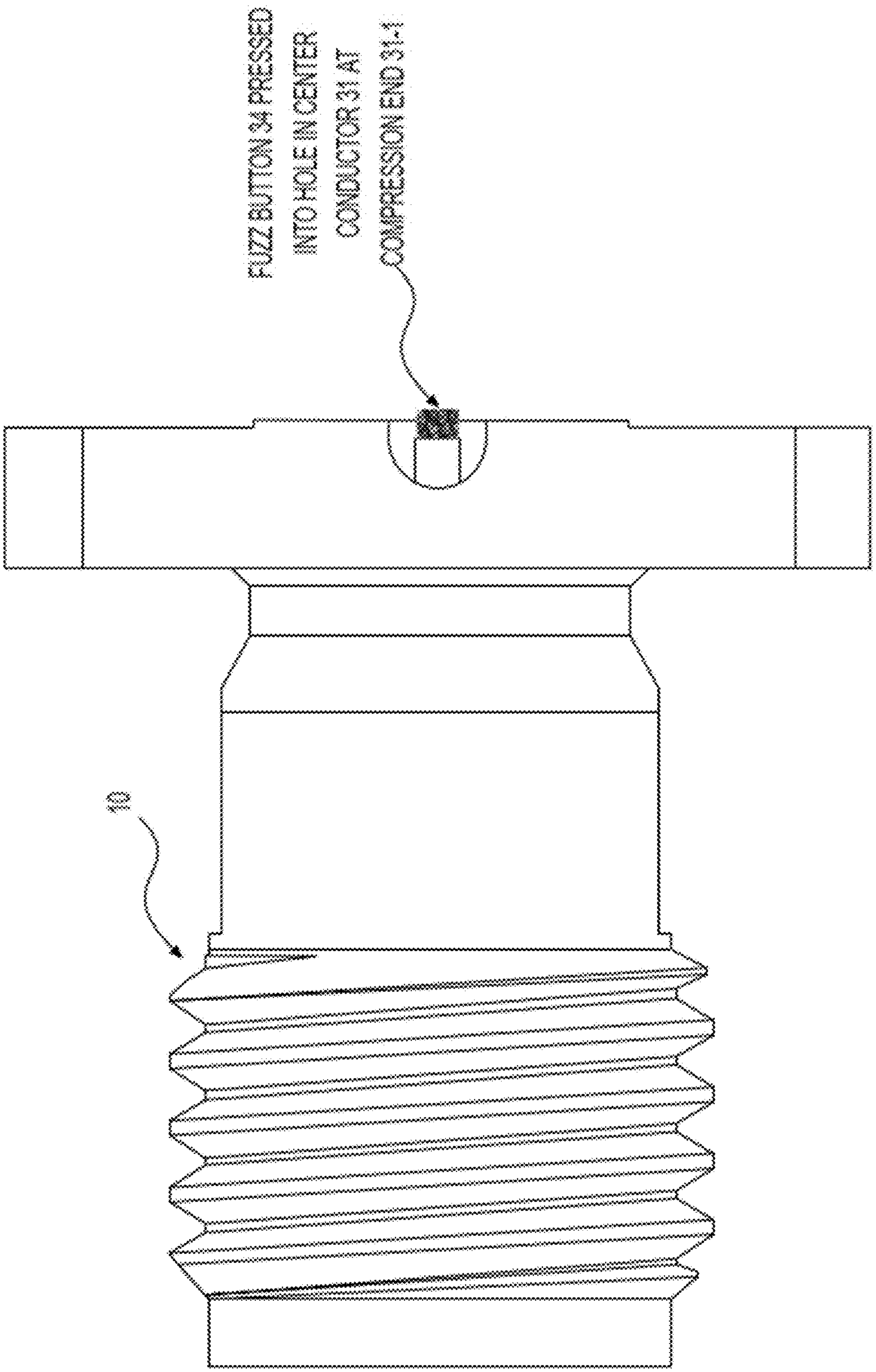
FIG. 7 is side view of a RF connector, such as a vertically mounted, RF compression connector with or without aligners, configured with a fuzz button.

In FIG. 6, RF compression connector 10 can also include a first insulator 24 and a first conductor 26. The first insulator 24 can keep the first conductor 26 electrically insulated from the connector housing 12 and the connector base 14. The first conductor 26 can include a first conductor end 28 and a first compression end 30. The first conductor end 28 can be positioned in the port 18 that can be defined by the connector housing 12. The first compression end 30 can be positioned adjacent to the connector base 14 and a grounding structure, grounding protrusion, or grounding ring 32. As noted above, the grounding ring 32 can take on a variety of shapes and is not limited to a circular shape. The first compression end 30 can be formed from and be part of the first conductor 26. The first compression end 30 can be formed from the first conductor 26, can be formed from an electrically conductive compressible or elastomeric material, can be or include a fuzz button 34 (FIG. 7), can define a pogo pin, or can define an electrically conductive, an elastomeric, or both an electrically conductive and an elastomeric structure other than a pogo pin. Fuzz buttons 34 (FIG. 7) are less expensive and less complex to make than pogo pins and are particularly useful for applications using a thin dielectric PCB having a thickness greater than zero and less than about 0.010 inch (0.254 mm).

Figure 8:
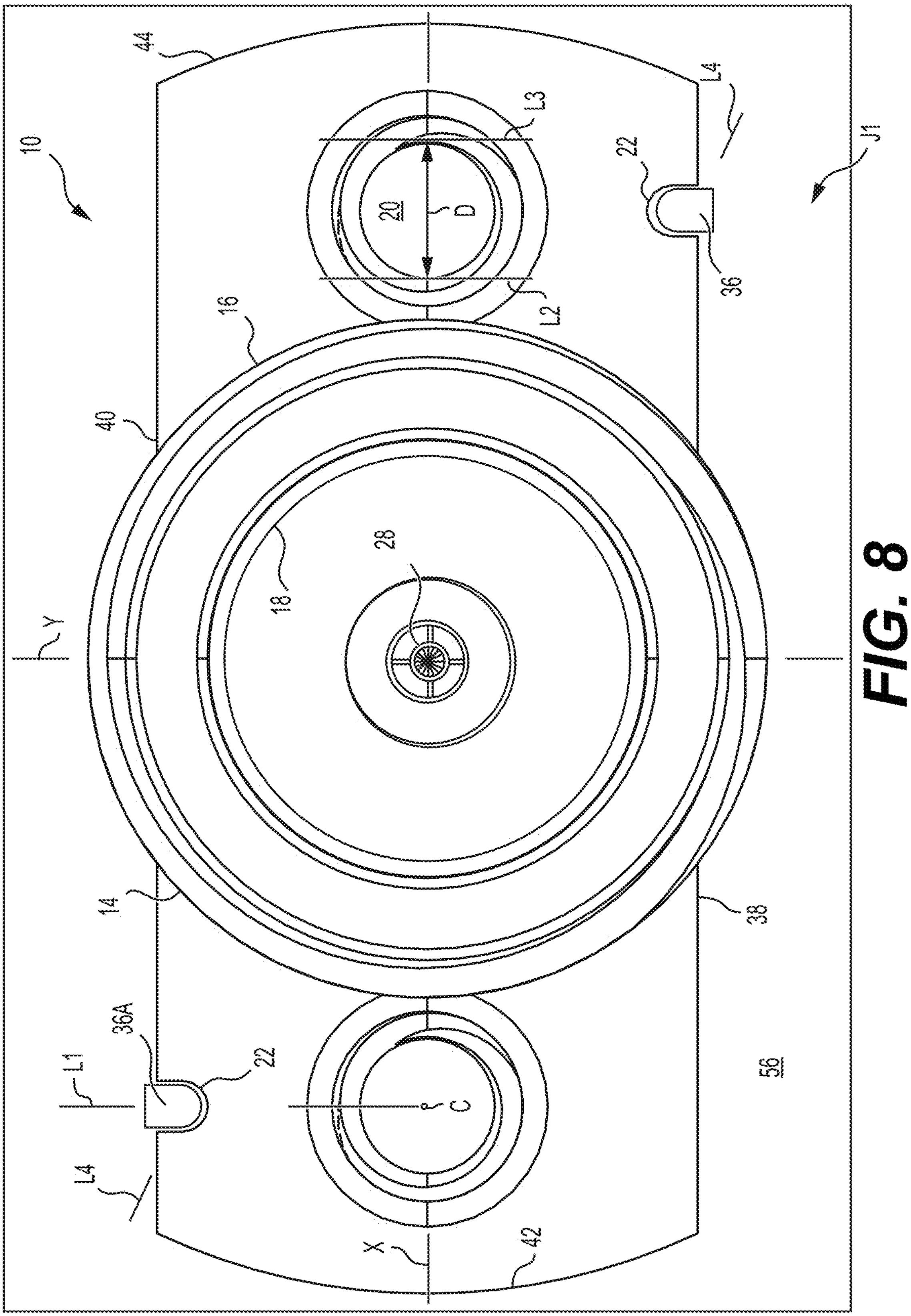
FIG. 8 is a top view of the vertically mounted, RF compression connectors shown in FIGS. 5 and 6 positioned on or adjacent to a mounting surface of a substrate.

As shown in FIG. 8, one possible technical solution to the misalignment problem is for an electrical connector, such as a vertically mounted, RF compression connector 10, or an optical connector, is to define, add, or form at least one or at least two aligners 22. Alone or in combination with defining, adding, or forming at least one or at least two aligners 22, a mounting surface 56 of mounting substrate J1 or the mounting substrate J1 can define or carry complementary, respective two-dimensional fiducials, markings, indicia, dummy traces, anti-pads, slots, divots, or recesses 36 or complementary, respective three-dimensional fiducials, markings, indicia, dummy traces, anti-pads, slots, divots, or recesses 36A. The complementary, respective two-dimensional fiducials, markings, indicia, dummy traces, anti-pads, slots, divots, or recesses 36 can be dedicated to only alignment, can have an electrical function (e.g., can be electrically connected to the connector or the connector body) in addition to alignment, can have a mechanical function (e.g., can provide mechanical support to the connector or the connector body or can prevent the connector or connector body from rotating) in addition to alignment, or can have electrical and mechanical functions in addition to alignment. The complementary, respective three-dimensional fiducials, markings, indicia, dummy traces, anti-pads, slots, divots, or recesses 36A can be dedicated to only alignment, can have an electrical function in addition to alignment, can have a mechanical function in addition to alignment, or can have electrical and mechanical functions in addition to alignment.

Alternatively, and not shown, the RF compression connector 10 can define at least one or at least two aligners 22 that is or are a protrusion or a boss, with the protrusion or the boss configured to be received in a slot, a divot, or a recess defined by the mounting substrate J1, such as the mounting surface 56. The at least one or at least two aligners 22 can be aligned visually, such as by eye, camera, etc., or by tactile feel with the corresponding, respective fiducials, markings, indicia, dummy traces, anti-pads, slots, divots, or recesses 36, 36A defined by the mounting substrate J1. Cooperation between a respective aligner 22 and a respective one of the two- or three-dimensional fiducials, markings, indicia, dummy traces, anti-pads, slots, divots, or recesses 36, 36A can locate and align the RF compression connector at a proper or desired location on the mounting substrate J1, and help align a respective center of the compression end 30 of the first conductor 26 with its corresponding and respective signal trace (15PA in FIGS. 1A-1F) or signal pad (7PA in FIGS. 1A-2F and P in FIG. 4).

With continuing reference to FIG. 8, the connector housing 12 or the connector base 14 can define at least one, at least two, a pair, at least three (not shown) or three or more (not shown) aligners 22. Other numbers of aligners 22 can be used, such as at least one aligner 22 or at least four aligners 22. At least one aligner 22 can be positioned such that a first line L1 that bisects the aligner 22 also passes through a center C of a corresponding compression fastener hole 20.

The connector base 14 of the connector housing 12 can simultaneously extend along both an X-axis or longitudinal axis and a Y-axis or width axis, where the X-axis can be longer in length than the Y-axis. Stated another way, the connector base 14 can define a generally rectangular shape. The connector base 14 can define a first side 38, a second side 40, a first end 42, and a second end 44. The first and second sides 38, 40 can each be parallel to each other, and can each be parallel to the X-axis. The first and second ends 42, 44 can be opposed to one another, and can each define a radius or curve R that intersects both the first and second sides 38, 40 of the connector base 14.

At least one aligner 22 can be positioned on the first side 36 of the connector base 14. At least one aligner 22 can be positioned on the second side 38. Respective ones of at least two aligners 22 can be positioned on both the first and the second sides 36, 38 (as shown) of the connector base 14. Each, at least one, or at least two aligners 22 can be defined by an open-ended or closed notch, recess, cutout, hole, concavity, or cavity in the connector base 14 of the connector housing 12. For example, as shown, each, at least one or at least two aligners 22 can be an open-ended notch, and the notch can be defined by a first notch radius and two first notch sidewalls. Aligners 22 are expressly not limited to open-ended notches or even notches in general. Aligners 22 can define or be defined by any shape, cross-sectional shape, or size.

Each respective aligner 22 can allow a corresponding, respective fiducial, marking, indicia, dummy trace, anti-pad, slot, divot, or recess 36, 36A defined by the mounting substrate J1 to be visually or tactically located in or on or over or under the respective aligner 22. The aligner 22 can be centered such that a center of a corresponding, respective fiducial, marking, indicia, substrate dummy trace, anti-pad, substrate slot, divot, or recess 36, 36A lies or can lie coincident or approximately coincident with a respective center of the corresponding aligner 22. Positive location can be confirmed by visual, camera or other inspection of desired alignment between a respective aligner 22 and a corresponding, respective fiducial, or marking, indicia, dummy trace, anti-pad, slot, divot, or recess 36, 36A.

At least two aligners 22 can be (as shown), or cannot be, offset mirror images of one another about the X-axis or longitudinal axis of the connector base 14. The at least two aligners 22 can be, or cannot be (as shown), offset mirror images of one another about the Y-axis or width axis of the connector base 14. The at least two aligners 22 can each be positioned on opposite sides of the X-axis, on opposite sides of the Y-axis, or on opposite sides of both the X- and Y-axis.

At least two aligners 22 can each be positioned such that, a first line L1 drawn perpendicular to first side 38 or second side 40 of connector base 14, such that the first line L1 does not intersect both of the at least two aligners 22. At least one of the at least two aligners 22 can be positioned between second and third parallel lines L2, L3 that can each lie tangential to an inner diameter D of a respective connector fastener hole 20 and can each lie substantially perpendicular to the first and second sides 38, 40 of the connector base 14. At least two aligners 22 can each be positioned along a fourth line L4 that passes through at least a respective portion of one of the at least two aligners 22, at least a portion of the other one of the at least two aligners 22, and at least a portion of port 18 and/or first conductor end 28 and/or external threads 16. The at least two aligners 22 can each define the same shapes or the same cross-sectional shapes. The at least two aligners 22 can each define different shapes or cross-sectional shapes.

An interconnect such as the RF compression connector 10 can generally include an aligner 22 or first alignment feature that is configured to engage with or to align with or to receive a corresponding, respective fiducial, marking, indicia, substrate dummy trace, anti-pad, substrate slot, divot, or recess 36, 36A or a second alignment feature. Alternatively, the first alignment feature can be a post, boss, or protrusion that is configured to be received in the second alignment feature. In another alternative, the first alignment feature can be a hole, a recess, or a concavity that is configured to receive a second alignment feature.

Figure 9B:
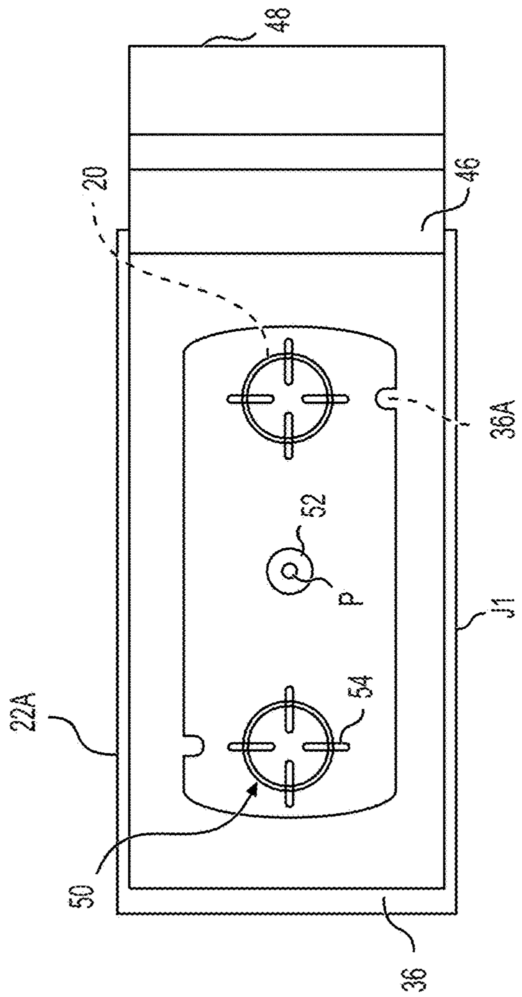
FIGS. 9A and 9B are a removable aligner removably mounted to a substrate.
Figure 9A:
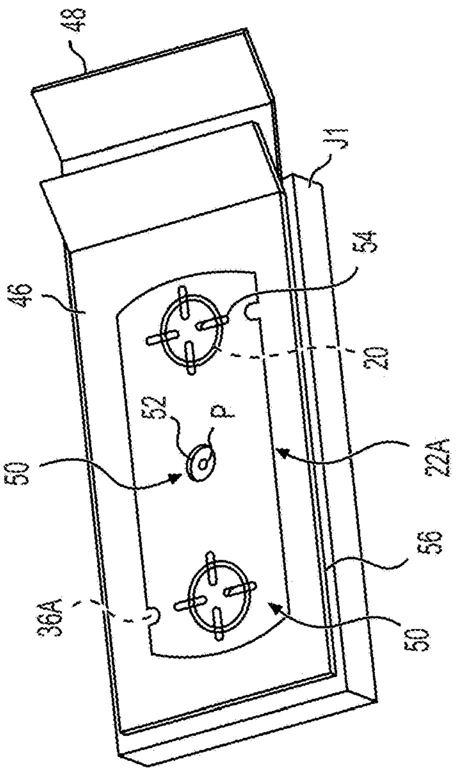

Another possible technical solution to this misalignment problem is shown in FIGS. 9A, 9B, and 10. FIGS. 9A and 9B generally show a removable aligner 22A, which can include a first part 46 and a second part 48. In general, the removable aligner 22A can include alignment fiducials 50, such as a center hole fiducial 52 and at least one or at least two fastener fiducials 54. For example, the first part 46 can be a first film, such as an approximate 2 mil (0.05 mm) thick transparent Kapton tape with pressure sensitive adhesive on one side of the first part 44 or the first film. The first part 46 can define the alignment fiducials 50, such as the center hole fiducial 52 and the fastener fiducial 54. At least one or at least two fastener fiducial or fiducials 54 can define a crosshair pattern that can permit proper alignment of the removable aligner 22A with respect to a signal pad P and respective connector fastener holes 20 defined by a mounting substrate J1.

The second part 48 can be a second film, such as an approximate 5 mil (0.13 mm) thick opaque Kapton tape with pressure sensitive adhesive on one side of the second part 48 or the second film. The second part 48 of the removable aligner 22A can be attached, such as removably attached, to the mounting surface 56 of a substrate, such as a RF substrate or mounting substrate J1. The second part can further define, carry, or display at least one, at least two, or two or more fiducials, markings, indicia, or protrusions 36A that can be configured to align with a corresponding aligner 22 (FIGS. 10B and 10C).

Figure 10A:
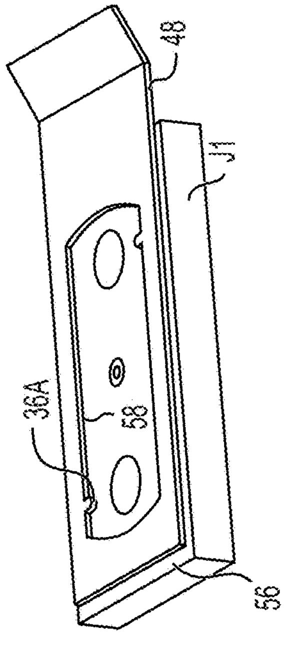
FIG. 10A is the removable aligner of FIGS. 9A and 9B with a first part removed.

Once the removable aligner 22A is properly positioned on the mounting substrate J1, as shown in FIGS. 9A and 9B, the first part 46 can be peeled or removed from the second part 48, as shown in FIG. 10A. With continued reference to FIG. 10A, the second part 48 can remain removably or adhesively held or attached to the mounting surface 56 of the mounting substrate J1. The second part 48 can have a material thickness, such as approximately 2 mils (0.05 mm) to 6 mils (0.15 mm). The material thickness can provide a lip, wall, edge, bump, barrier, or step 58 that, in turn, can help prevent the RF compression connector 10 from moving, shifting, rotating, or changing its position with respect to the mounting surface 56 of the mounting substrate J1 as the RF compression connector 10 is secured to the mounting substrate J1 by the fasteners (not shown).

Figure 10B:
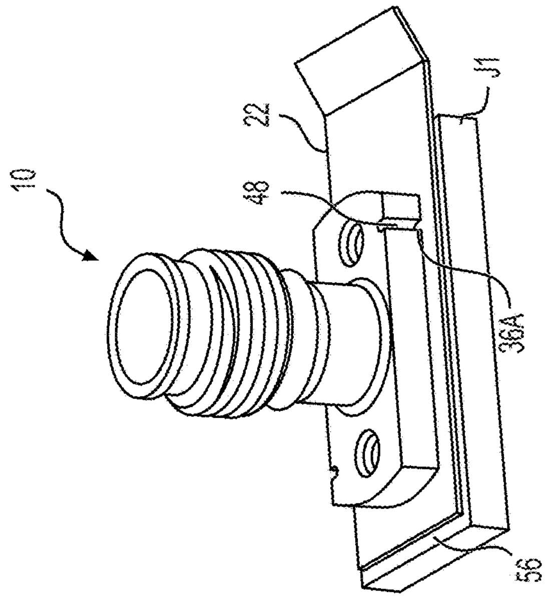
FIG. 10B is the removable aligner of FIG. 10A with a vertically mounted, RF compression connector positioned on the substrate.

As shown in FIG. 10B, with the second part 48 still attached to the mounting substrate J1, a RF compression connector 10 can be positioned on the mounting substrate J1, such as the mounting surface 56. The second part 48 can circumscribe the RF compression connector 10. The fiducials, markings, indica, or protrusions 36A can be configured to align with a corresponding aligner 22. The RF compression connector 10 can be secured to the mounting substrate J1 with respective fasteners (not shown).

Figure 10C:
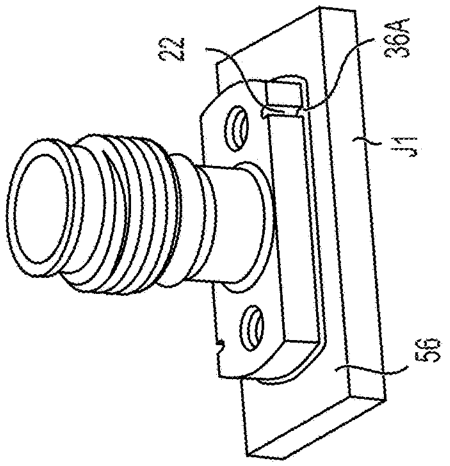
FIG. 10C is the removable aligner and vertically mounted, RF compression connector of FIG. 10B, with a second part of the removable aligner removed.

With reference to FIG. 10C, once the RF compression connector 10 is releasably secured or secured to the mounting substrate J1, the second part 48 can be peeled or removed from the mounting surface 56 of the mounting substrate J1.

Even though the embodiments described so far solve the technical problem of connector alignment on a substrate in general, and compression end alignment with a corresponding signal or ground pad in particular, another embodiment is described in combination with FIGS. 11-13F.

Figure 11:
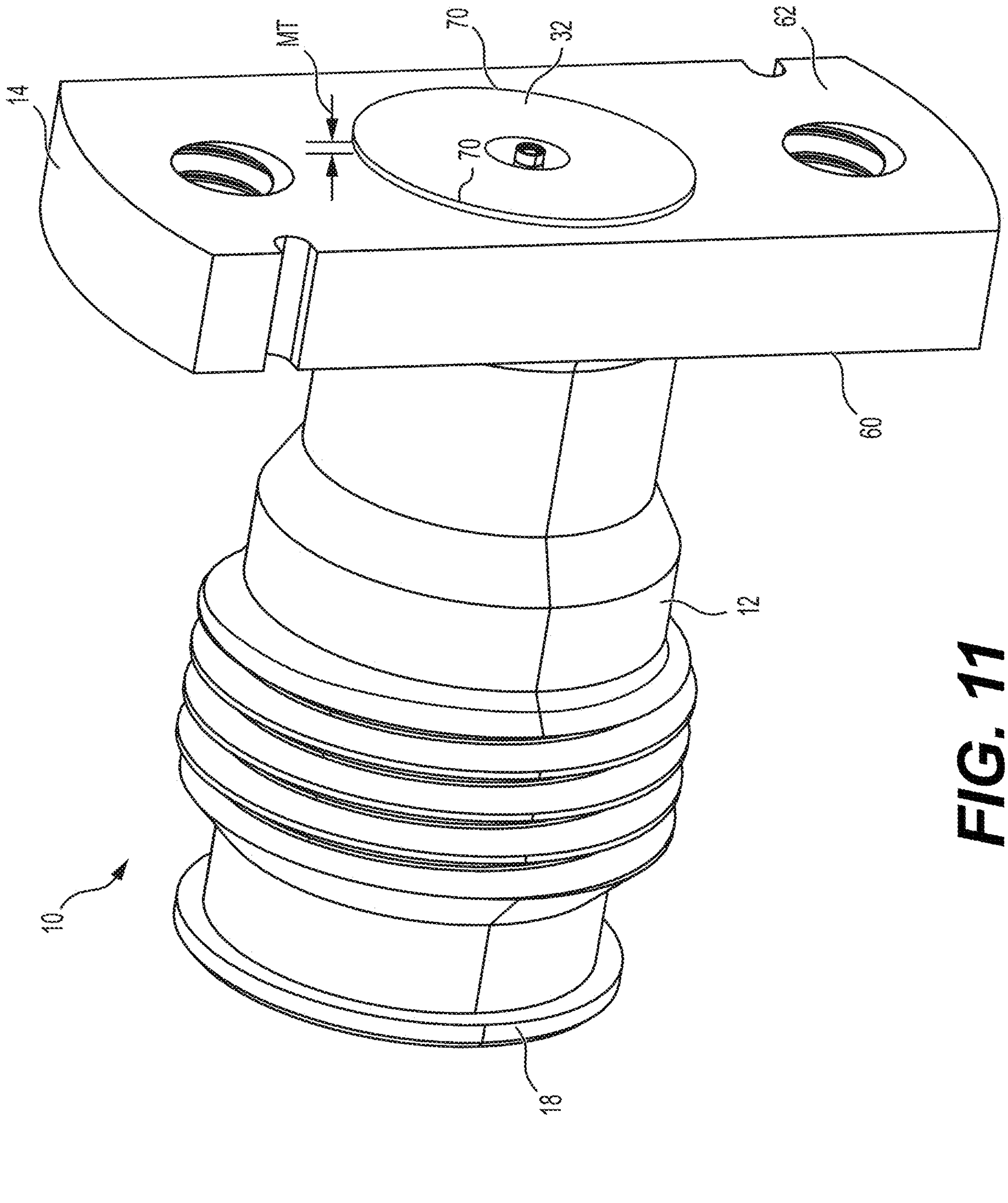
FIG. 11 is a perspective side view of the vertically mounted, RF compression connector shown in FIGS. 5, 6, 8 and FIGS. 10B and 10C.

FIG. 11 shows a connector, such as a vertically mounted, RF compression connector 10. The connector base 14 can define a first base side 60 and a second base side 62 that can be positioned opposite to and parallel to the first base side 60. The port 18 that can be defined by the connector housing 12 and can extend from or intersect the first base side 60. The grounding ring 32 can take the shape of a platform, riser, or plateau and can extend from the second base side 62. The grounding structure or grounding ring 32 (including any one or all of 9PA/9APA/9BPA in FIGS. 1A-3D) can have a material thickness MT of approximately 0.003 in (0.08 mm) or some other suitable material thickness.

This material thickness MT of the grounding ring 32 can be used, in part, to maintain alignment of the RF compression connector 10 during installation of the RF compression connector 10 onto the mounting surface 56 of a mounting substrate J1.

Figure 12A:
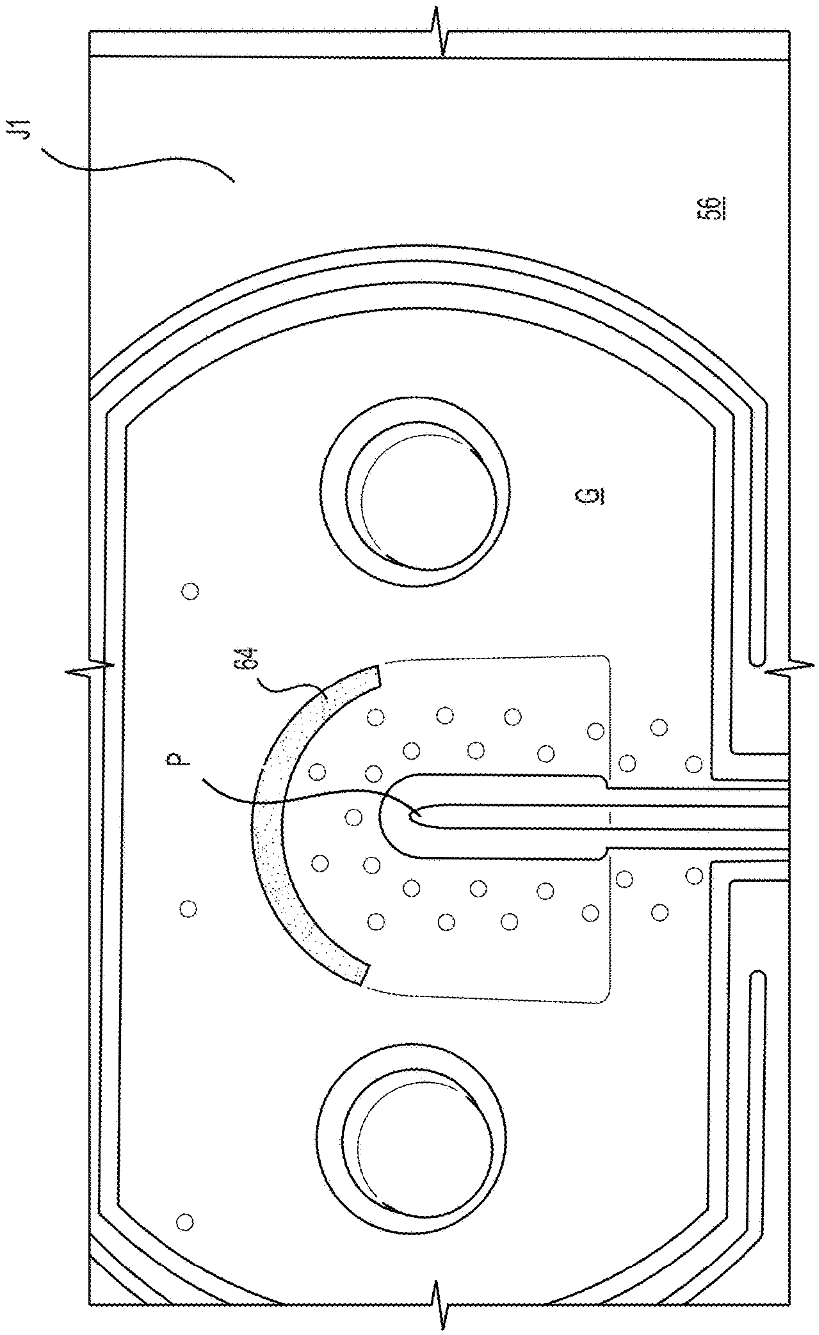
FIG. 12A is a top view of a ground plane positioned on a mounting surface of a mounting substrate and a second anti-pad defined by the ground plane.

In FIG. 12A, the ground plane G can be applied to the mounting surface 56 of the mounting substrate J1. The ground plane G can have or define a corresponding ground plane material thickness. The ground plane G can be deposited and etched or ablated or masked and selectively plated to create a trough, a relief, a valley, or a second anti-pad 64 in the ground plane G. The second anti-pad 64 can be partially or fully devoid of electrically conductive material, ground plane G, or both electrically conductive material and ground plane G. The second anti-pad 64 can take the same or similar peripheral shape as a ground ring 32 shown in any of FIGS. 1A-3D and 11, such a portion or a segment or an arc length of a circle, a D-shape, U-shape, a racetrack shape, or any other suitable ground ring 32 perimeter or peripheral shape. A shape or peripheral shape of the second anti-pad 64 does not have to exactly coincide with or match a peripheral or perimeter shape of a corresponding ground ring 32.

Figure 12B:
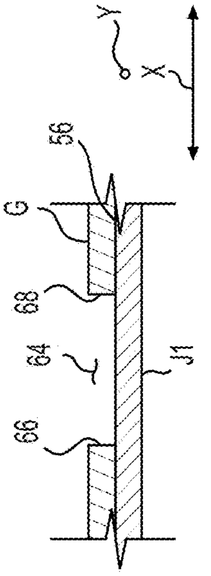
FIG. 12B is a cross-sectional, schematic view of the second anti-pad shown in FIGS. 12A and 12C.

In FIG. 12B, the second anti-pad 64 can be at least partially defined by at least one or at least two ridge walls 66, 68 of the ground plane G material positioned adjacent to the mounting surface 56 of the mounting substrate J1.

When any RF compression connectors 1AP1, 1AP2, 1AP3, 10 described herein are placed onto the mounting surface or the ground plane G of the mounting substrate J1 and when the fasteners (not shown) that can extend through the respective connector fastener holes 20 (FIG. 8) and substrate fastener holes H (FIG. 4) are tightened, the connector base 14 can bow between the fasteners (not shown) or the connector fastening holes 20, in a direction away from mounting surface 56 of the mounting substrate J1. This bowing of the connector base 14 is not normally a desirable effect but can now be used as an advantage. As the connector base 14 bows ever so slightly, e.g., 0.001 inches (0.025 mm), a peripheral edge, surface, periphery, or wall 70 (FIG. 11) of the ground ring 32 can catch or engage or interfere with the at least one ridge wall 66, 68 of the second anti-pad 64. This catching or engagement or mechanical interference between an edge, surface, periphery, or wall 70 (FIG. 11) of the ground ring 32 (FIG. 11) and a corresponding one of the ridge walls 66, 68 that define the second anti-pad 64 can prevent the connector base 14 from moving in the X-Y directions with respect to the mounting surface 56 of the mounting substrate J1, and can help to keep the compression end 30 of the first conductor 26 (FIG. 11) properly aligned on the corresponding signal pad P (FIGS. 1A-2F and 12A).

Figure 12C:
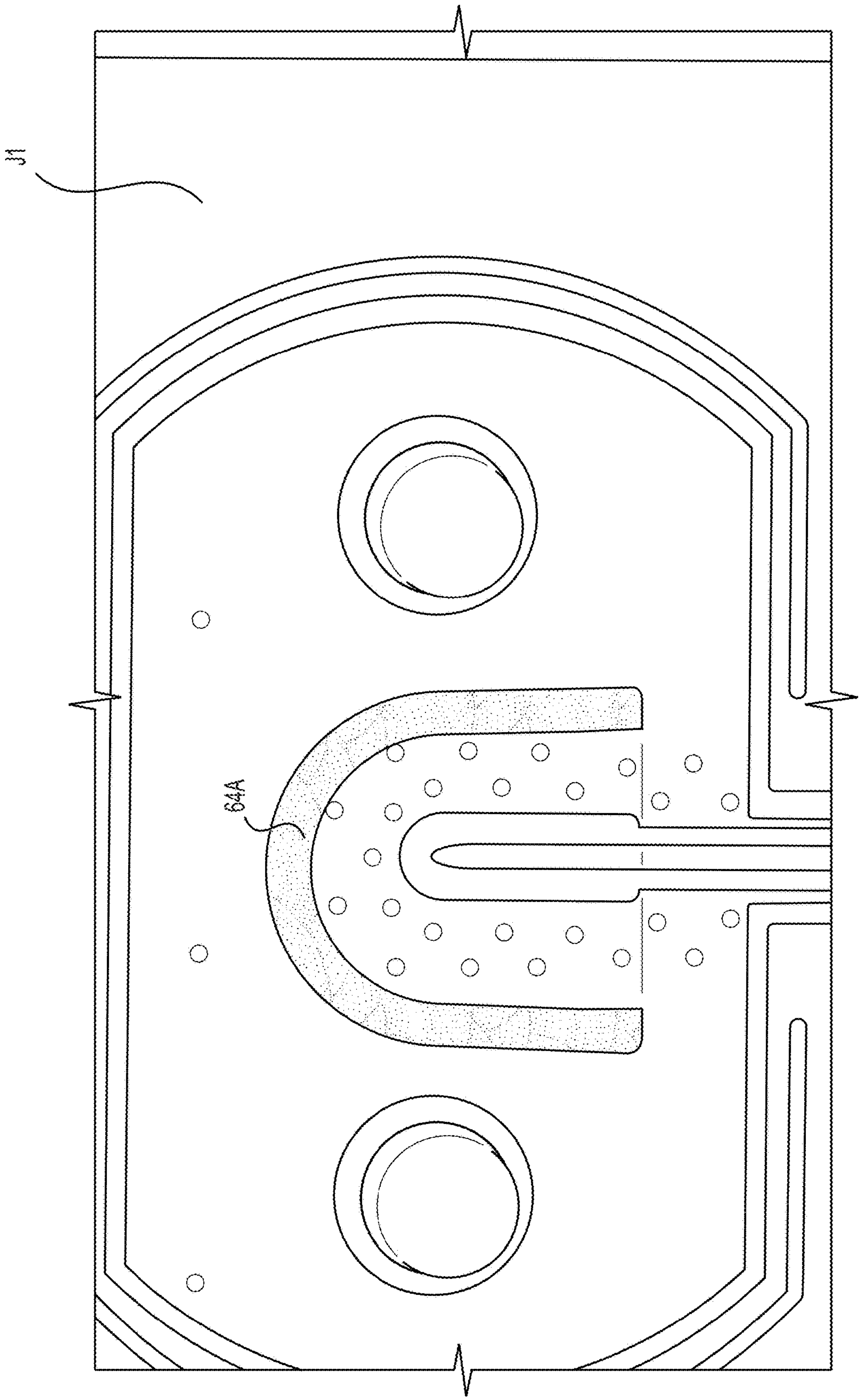
FIG. 12C is a top view of a ground plane positioned on a mounting surface of a mounting substrate and another second anti-pad defined by the ground plane.
Figure 13A:
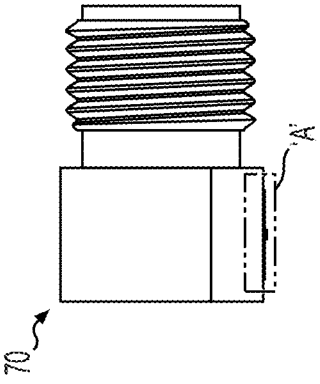
FIGS. 13A-13F generally show a waveguide connector.
Figure 13B:
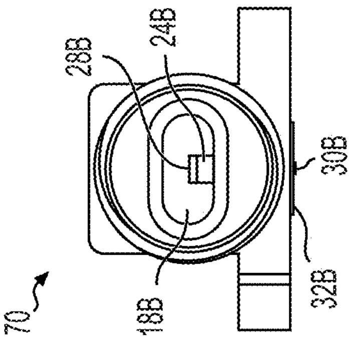
Figure 13C:
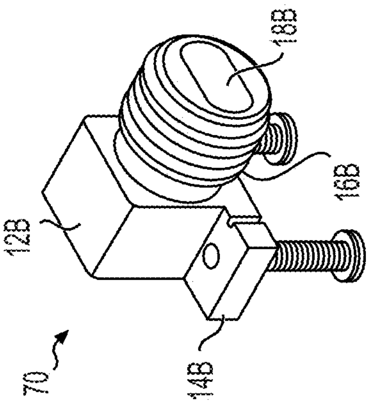
Figure 13D:
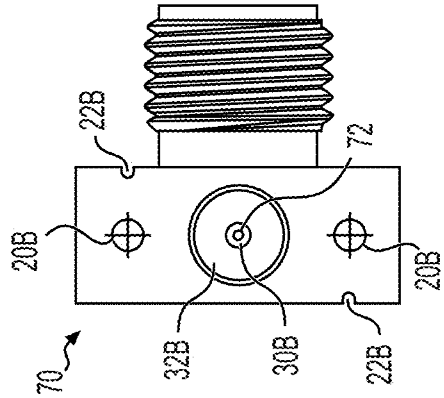
Figure 13E:
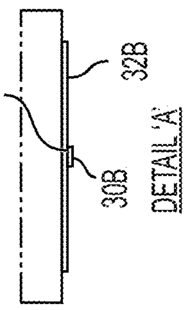
Figure 13F:
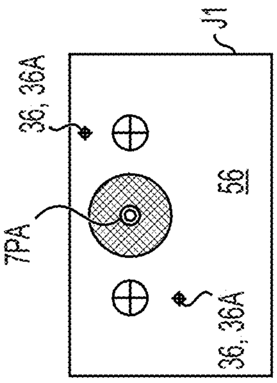

FIG. 12C shows that a third anti-pad 64A, which is similar to the second anti-pad 64, but can take the same peripheral shape as the horseshoe shaped ground ring 9PA shown in FIGS. 1A-1F, or a portion or a segment or an arc length of the horseshoe shaped ground ring 9PA. The second and third anti-pads 64, 64A can be any shape that accommodates at least a portion of a corresponding grounding ring 32 shapes or peripheral or perimeter shapes disclosed herein, and any other ground ring 32 shapes or peripheral shapes.

A method can include the step of making a signal trace pad P larger in area.

A method can include the steps of providing an aligner 22 on a connector, such as a RF compression connector 10; providing a fiducial, marking, indicia, and/or a dummy trace 36, 36A on a mounting substrate J1 or a mounting surface 56 of the mounting substrate J1; and visually aligning the aligner 22 with the fiducial, marking, indicia, and/or dummy trace 36, 36A.

A method can include the steps of providing a removable aligner 22A that includes a first part 46 and a second part 48; attaching the removable aligner 22A to a mounting substrate J1, such as a mounting surface 56 of the mounting substrate J1; removing the first part 46; positioning a connector such as a RF compression connector 10 inside a cutout defined by the second part 48; and removing the second part 48.

A method can include the steps of creating an anti-pad, such as a second or third anti-pad 64, 64A in a ground plane G; positioning a grounding ring 32 of a RF compression connector 10 adjacent to at least one of a first and second ridge wall 66, 68 of the ground plane P that partially defines the second or third anti-pad 64, 66; tightening the grounding ring 32 to the ground plane G; and using an interference fit between a peripheral edge, surface, periphery, or wall 70 of the grounding ring 32 and a respective one or both of the ridge walls 66, 68 to prevent the RF compression connector 10 from moving in an X-direction, a Y-direction, or both X- and Y-directions.

FIGS. 13A-13F generally shows a waveguide connector 70, such as a compression waveguide connector. The waveguide connector 70 can define, add, or form at least one or at least two aligners 22B. Alone or in combination with defining, adding, or forming at least one or at least two aligners 22B, a mounting surface 56 of mounting substrate J1 or the mounting substrate J1 can define or carry complementary, respective two-dimensional fiducials, markings, indicia, dummy traces, anti-pads, slots, divots, or recesses 36 or complementary, respective three-dimensional fiducials, markings, indicia, dummy traces, anti-pads, slots, divots, or recesses 36A. Alternatively, and not shown, the compression waveguide connector can define at least one or at least two aligners 22B that is or are a protrusion or boss, with the protrusion or boss configured to be received in a slot, a divot, or a recess defined by the mounting substrate J1, such as the mounting surface 56. The at least one or at least two aligners 22B can be aligned visually, such as by eye, camera, etc., or by tactile feel with the corresponding, respective fiducials, markings, indicia, dummy traces, anti-pads, slots, divots, or recesses 36, 36A defined by the mounting substrate J1. Cooperation between a respective aligner 22B and a respective one of the two- or three-dimensional fiducials, markings, indicia, dummy traces, anti-pads, slots, divots, or recesses 36, 36A can locate and align the waveguide connector 70 at a proper or desired location on the mounting substrate J1 and help align a respective first compression end 30B of a first signal antenna 72, such as a RF signal antenna, with its corresponding and respective signal trace (15PA in FIGS. 1A-1F) or signal pad 7PA.

The waveguide connector 70 can include a connector housing 12B. The connector housing 12B can define a connector base 14B. The connector housing 12B and the connector base 14B can be unitary with one another, be monolithic or be formed, machined, or cast as a single body, and can be made from an electrically conductive material, such as metal. The connector housing 12B can define external threads 16B adjacent to the at least one port 18B of the waveguide connector 70. The at least one port 18B can be configured to receive a waveguide, such as an extruded dielectric waveguide. The at least one port 18B can define, in cross-section, a circle, an oval, an ellipse, or a non-circular shape. At least one or at least two connector fastener holes 20B can be defined by the connector housing 12B or the connector base 14B. At least one aligner 22B, which can be a structure other than one of the connector fastener holes 20B or the trace cover 13PA shown in FIGS. 3A-3D. The at least one aligner 22B can be defined by any one of the connector housing 12B or the connector base 14B.

The waveguide connector 70 can include a first insulator 24B. The first insulator 24B can keep the first signal antenna 72 electrically insulated from the connector housing 12B and the connector base 14B. The first signal antenna 72 can include a first conductor end 28B and a first compression end 30B. The first conductor end 28B can be positioned in the port 18B that can be defined by the connector housing 12B. The first compression end 30B can be positioned adjacent to the connector base 14B and a grounding structure, grounding protrusion, or grounding ring 32B. As noted above, the grounding ring 32B can take on a variety of shapes and is not limited to a circular shape. The first compression end 30B can be formed from and be part of the first signal antenna 72. The first compression end 30B can be formed from the first signal antenna 72, can be formed from an electrically conductive compressible or elastomeric material, can be or include the fuzz button 34 shown in FIG. 7, can define a pogo pin, or can define an electrically conductive, an elastomeric, or both an electrically conductive and an elastomeric structure other than a pogo pin. Fuzz buttons 34 (FIG. 7) are less expensive and less complex to make than pogo pins and are particularly useful for applications using a thin dielectric PCB having a thickness greater than zero and less than about 0.010 inch (0.254 mm).

Figure 14:
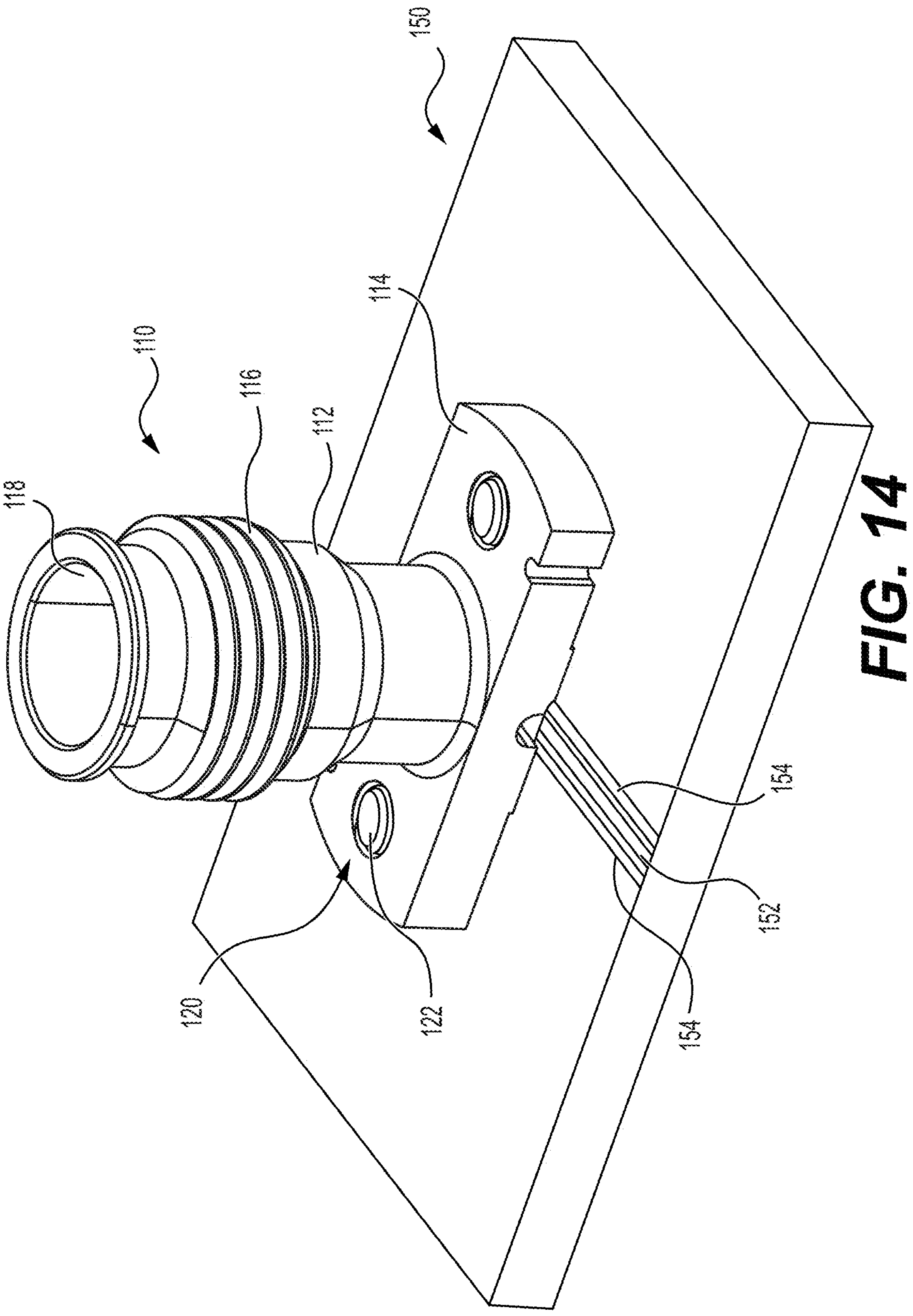
FIG. 14 is a perspective top view of an RF connector mounted to a substrate.
Figure 15:
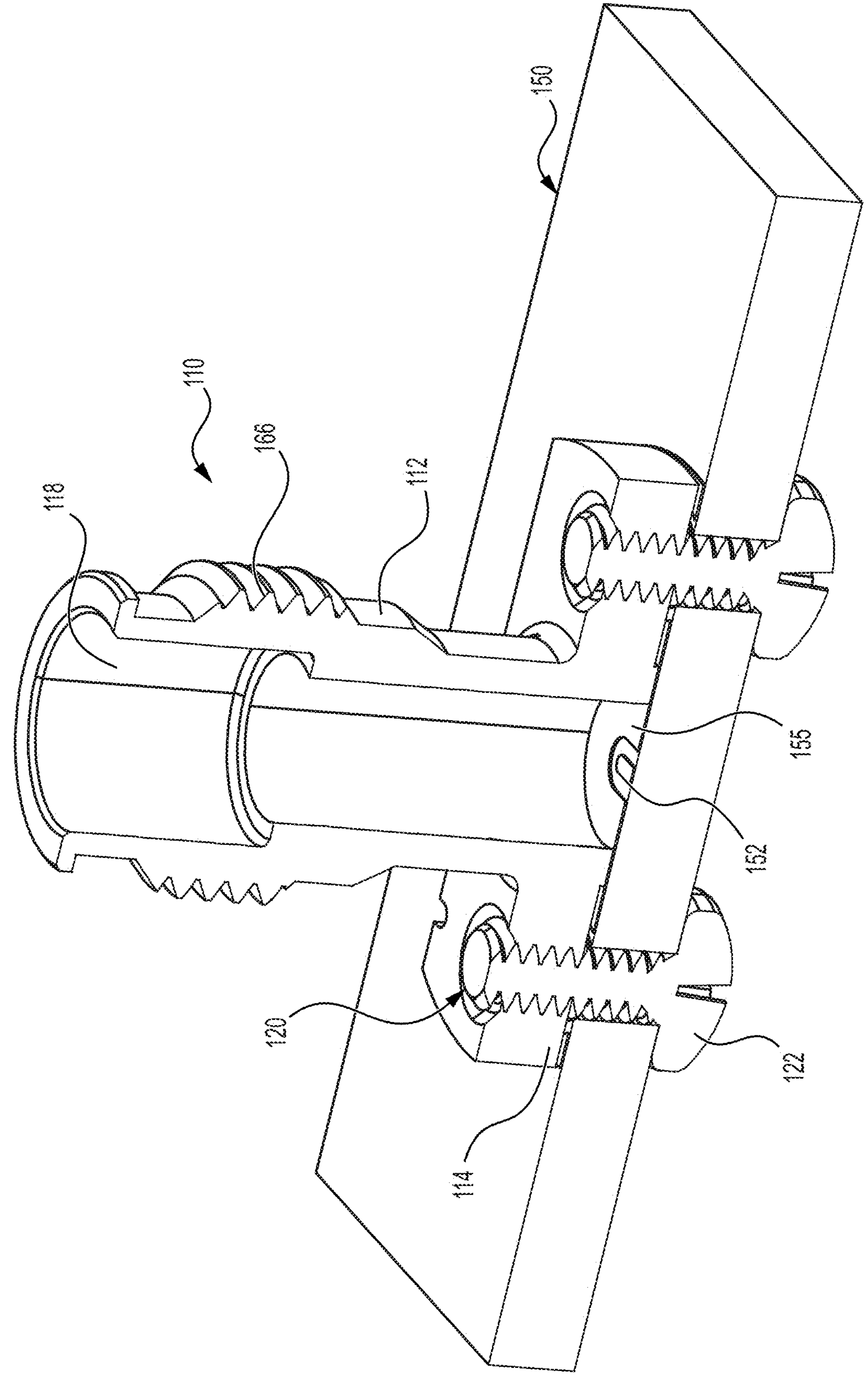
FIG. 15 is a cross-sectional view of the RF connector and substrate shown in FIG. 14.
Figure 16:
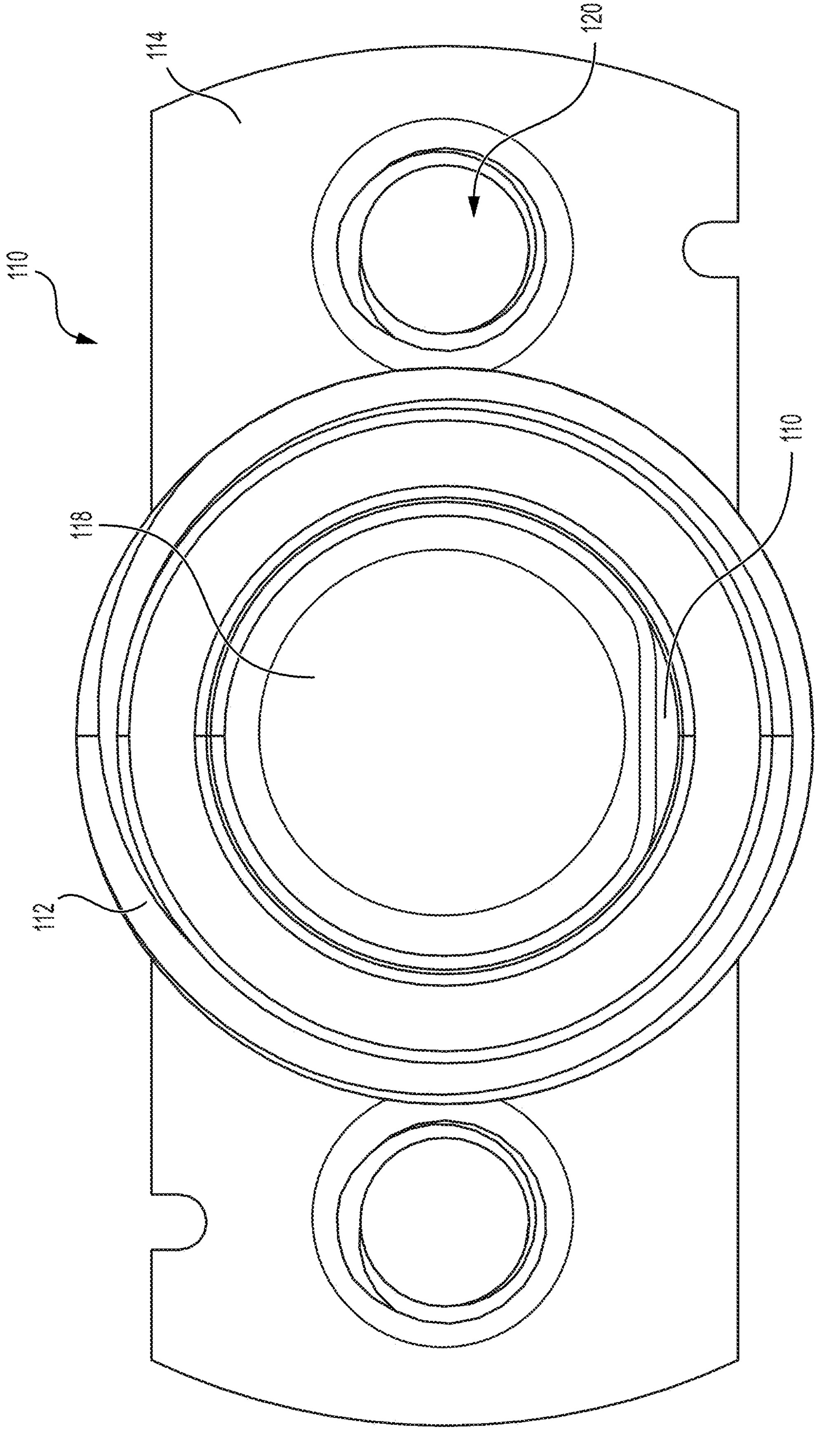
FIG. 16 is a top view of the RF connector shown in FIG. 14.

FIG. 14 is a perspective top view of an RF connector 110 mounted to a substrate 150. FIG. 15 shows a cross-sectional view of the RF connector 110 and the substrate 150. FIG. 16 is a top view of the RF connector 110. The RF connector 110 can be the same as, or similar to, the RF connector 10 shown in FIG. 5. In particular, the RF connector 110 can be, but is not limited to, a vertically mounted, RF compression connector 10. For example, a vertically mounted, RF compression connector can mean any one or all of 1PA1, 1PA2, 1PA3, or 10. However, reference numeral 10 is also broader in scope because reference numeral 10 also includes any surface mounted or compression electrical or optical connector, not just one of the vertically mounted, RF compression connectors 1PA1, 1PA2, 1PA3 shown in FIGS. 1A-3D or the RF connector 110 shown in FIG. 14. The same is true for single RF conductor 3PA and center conductor 131. Single RF conductor 3PA can include vertically mounted, RF compression connectors 1PA1, 1PA2, 1PA3, while center conductor 131 can be any first conductor in any type of electrical connector. Compression end 5PA and compression end 131-1 are yet other examples. Compression end 5PA can include a vertically mounted, RF compression connector. Compression ends 5PA and 131-1 can both include identical or slightly different structures, but compression end 131-1 is expressly not limited to a vertically mounted, RF compression connector. Compression end 131-1 can also apply to right angle RF compression connectors and waveguide compression connectors, such as right angle or vertical compression, waveguide connectors.

As shown in FIGS. 14-16, the RF connector 110 can include a connector housing 112. The connector housing 112 can further define a connector base 114. The connector housing 112 and the connector base 114 can be unitary with one another or be formed, machined, or cast as a single body, and can be made from an electrically conductive material, such as metal. The connector housing 112 can define external threads 116 adjacent to at least one port 118 of the RF connector 110. At least one or at least two connector fastener holes 120 can be defined by the connector housing 112 or the connector base 114. The RF connector 110 can also include a ridge 119 as an alignment feature, as discussed further below.

Figure 17:
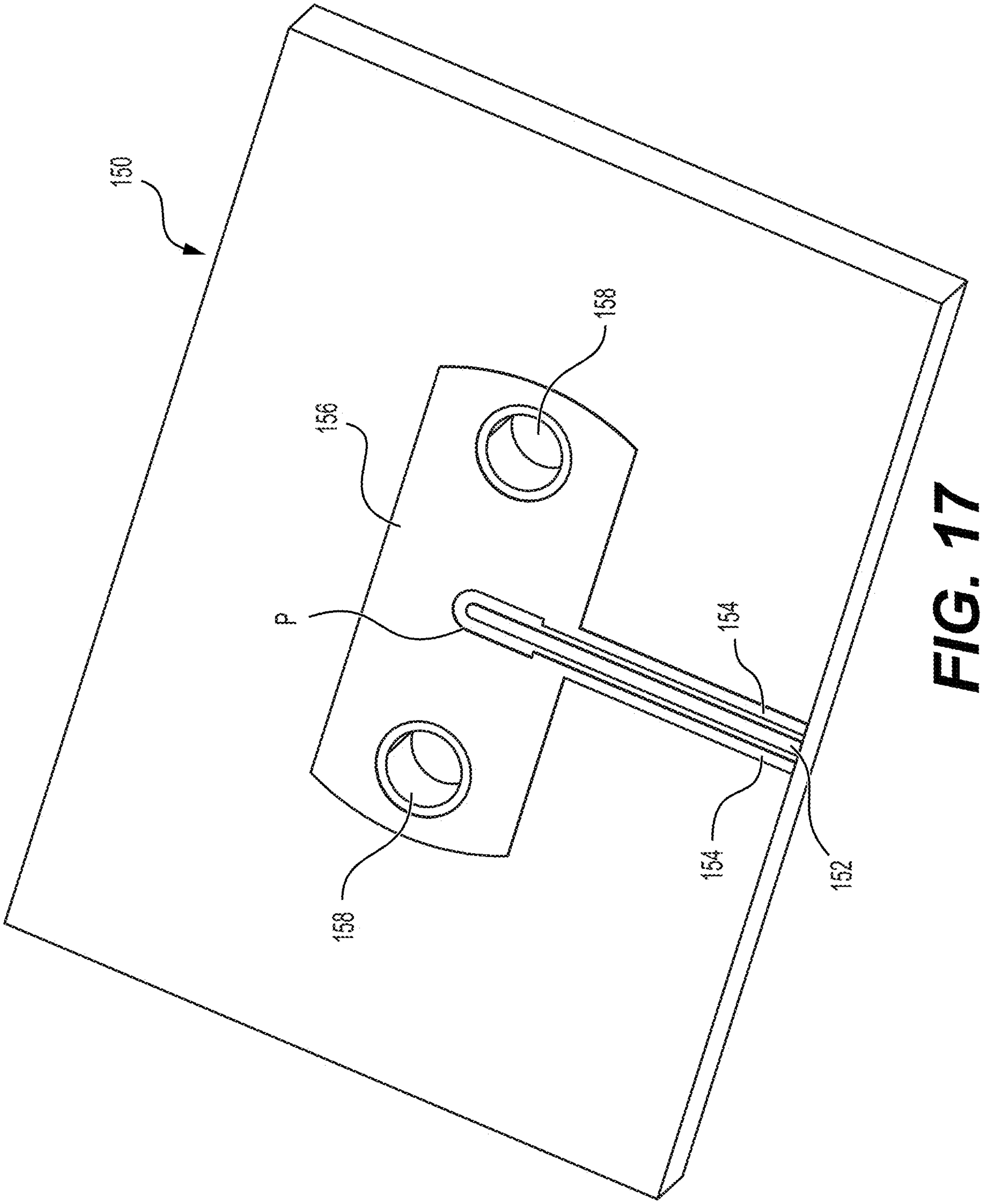
FIG. 17 is a perspective top view of the substrate shown in FIG. 14.

FIG. 17 is a perspective top view of the substrate 150 shown in FIG. 14. As shown in FIGS. 14-17, the RF connector 110 can be secured to the substrate 150 by screws 122 or the like that are inserted through substrate fastener holes 158 and received by the connector fastener holes 120. The substrate 150 further includes a signal trace 152 and one or more ground traces 154. Although FIGS. 14 and 17 show that two ground traces 154 can be provided in parallel with the signal trace 152 located therebetween in a stripline arrangement, the substrate 150 is not limited to this specific arrangement. The ground traces 154 connect with a ground plane 156 that can contact the electrically conductive material of the connector housing 112. Although the signal trace 152, the ground traces 154, and the ground plane 156 are shown as being provided on an outer surface of the substrate 150, one or more of the signal trace 152, the ground traces 154, and the ground plane 156 may extend below the outer surface of the substrate 150.

Figure 18:
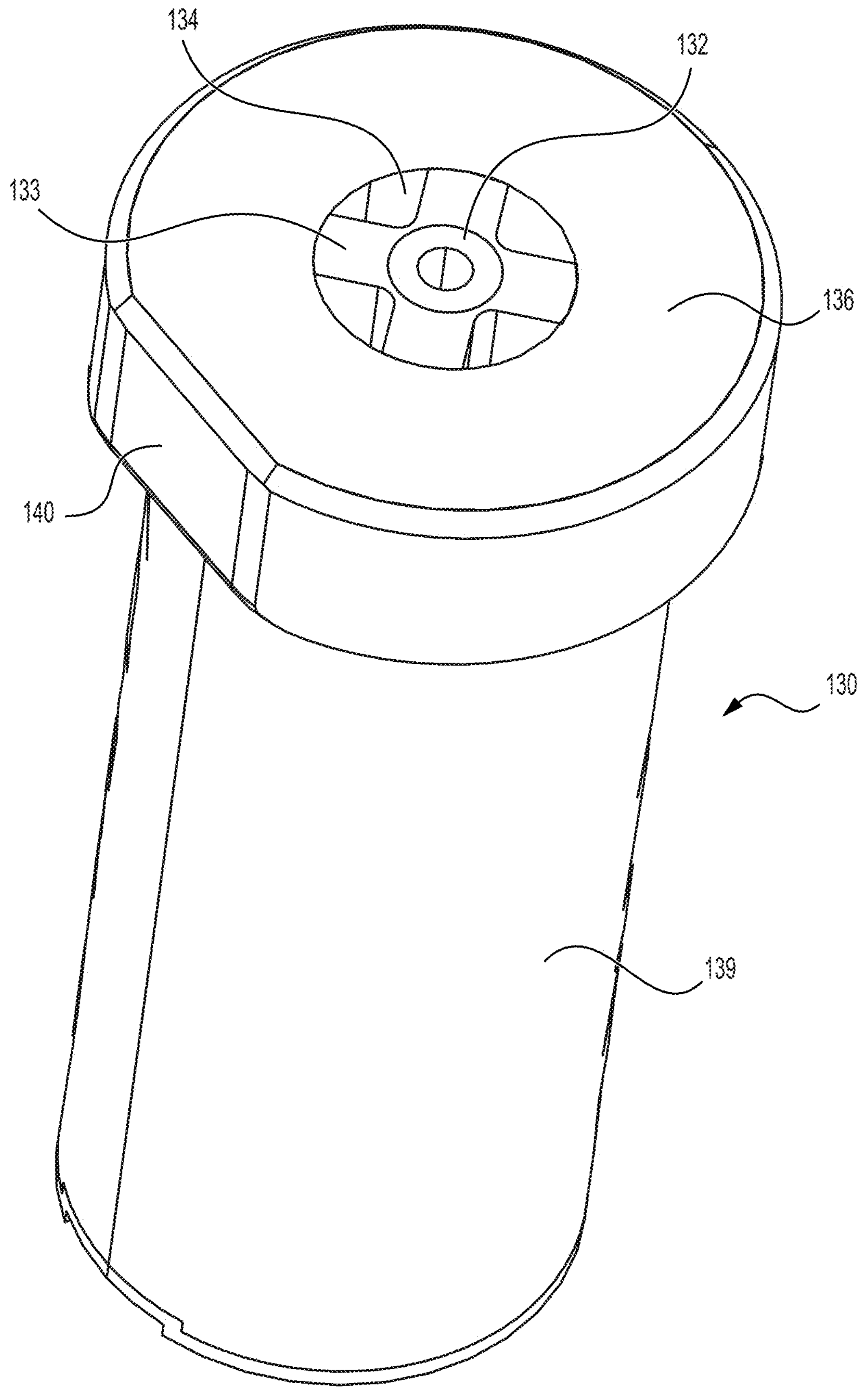
FIG. 18 is a perspective top view of a core that is insertable into the RF connector shown in FIG. 14.
Figure 19:
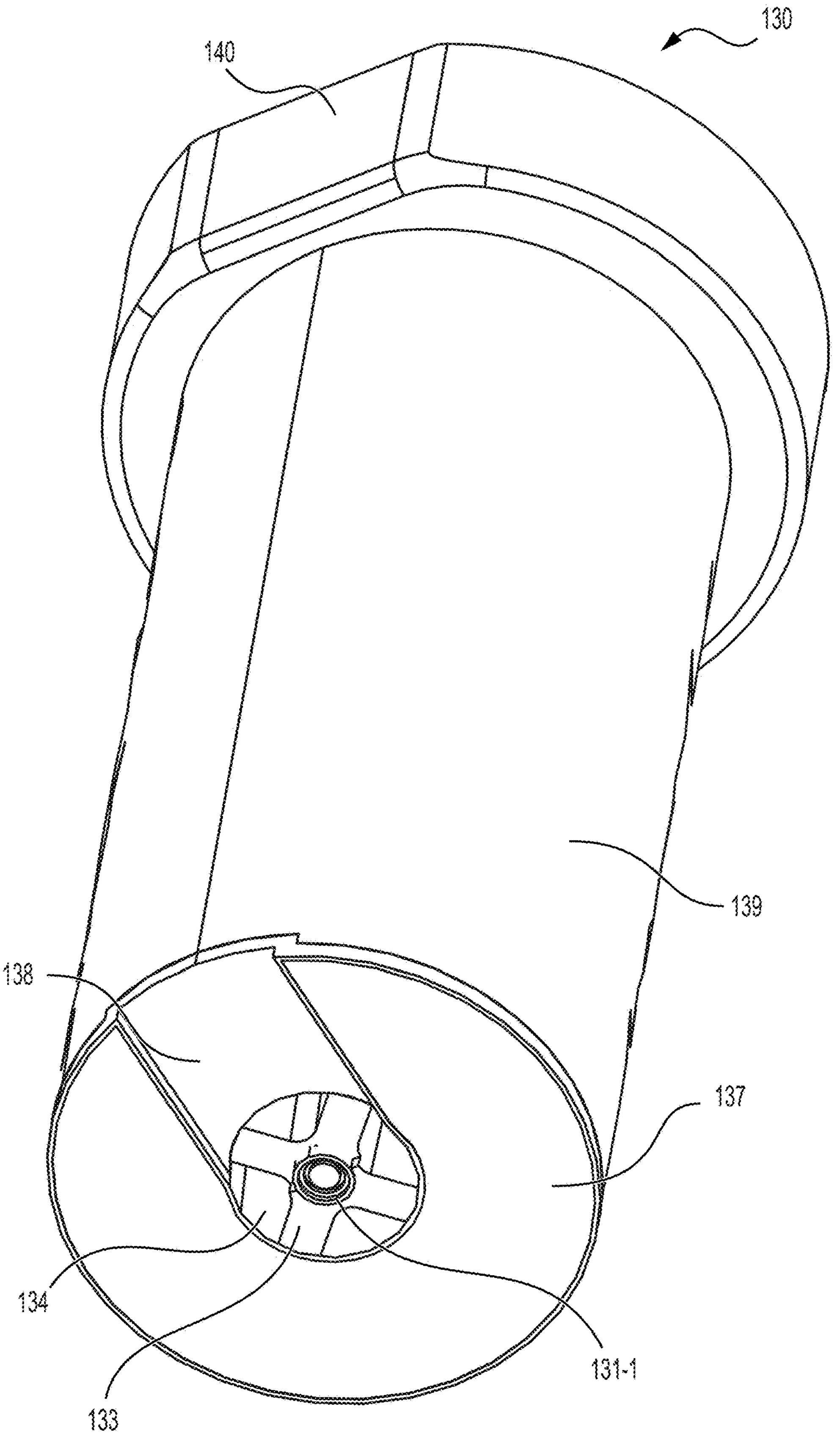
FIG. 19 is perspective bottom view of the core shown in FIG. 18.
Figure 20:
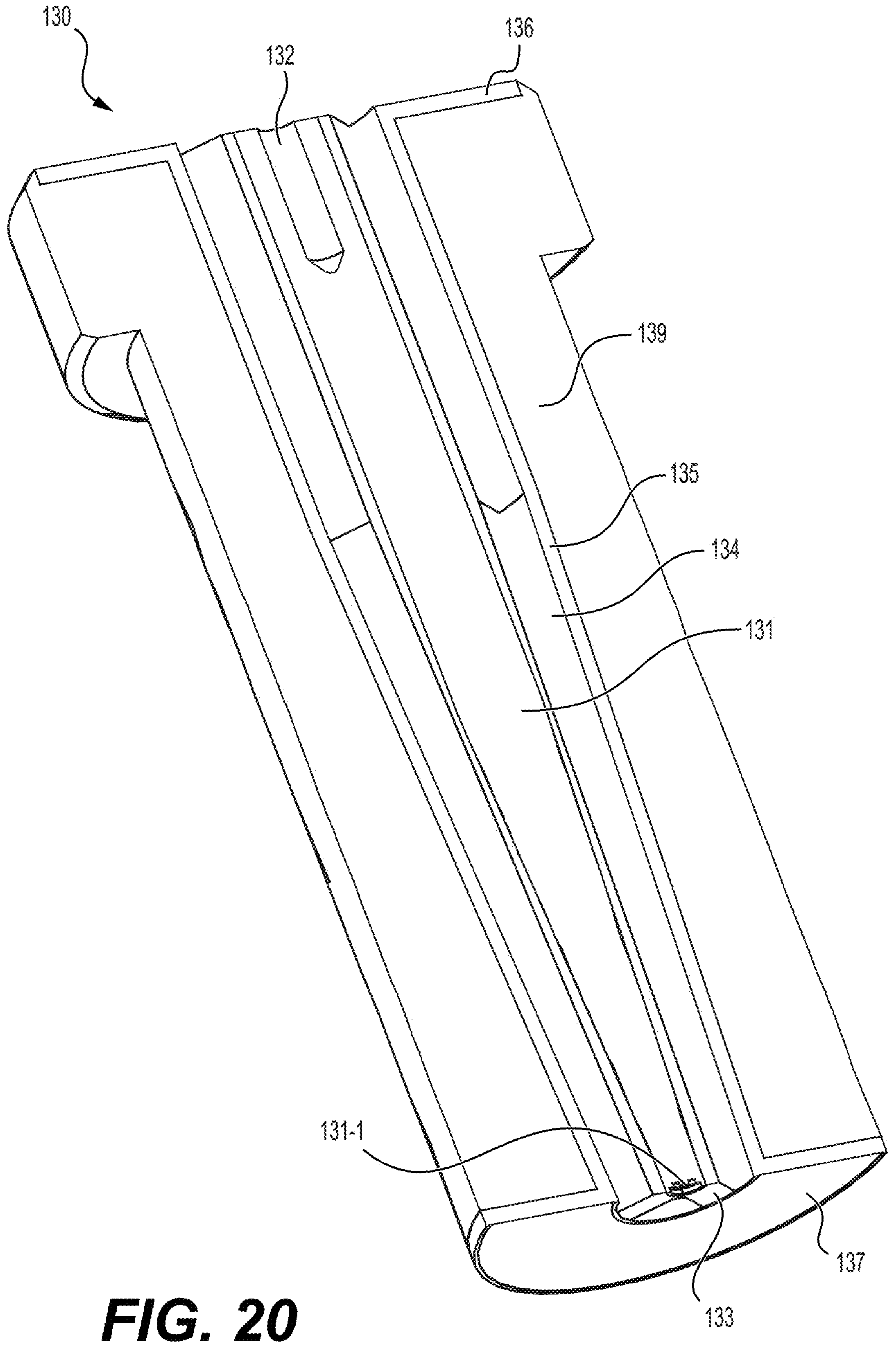
FIG. 20 is a cross-sectional view of the core shown in FIG. 18.
Figure 28:
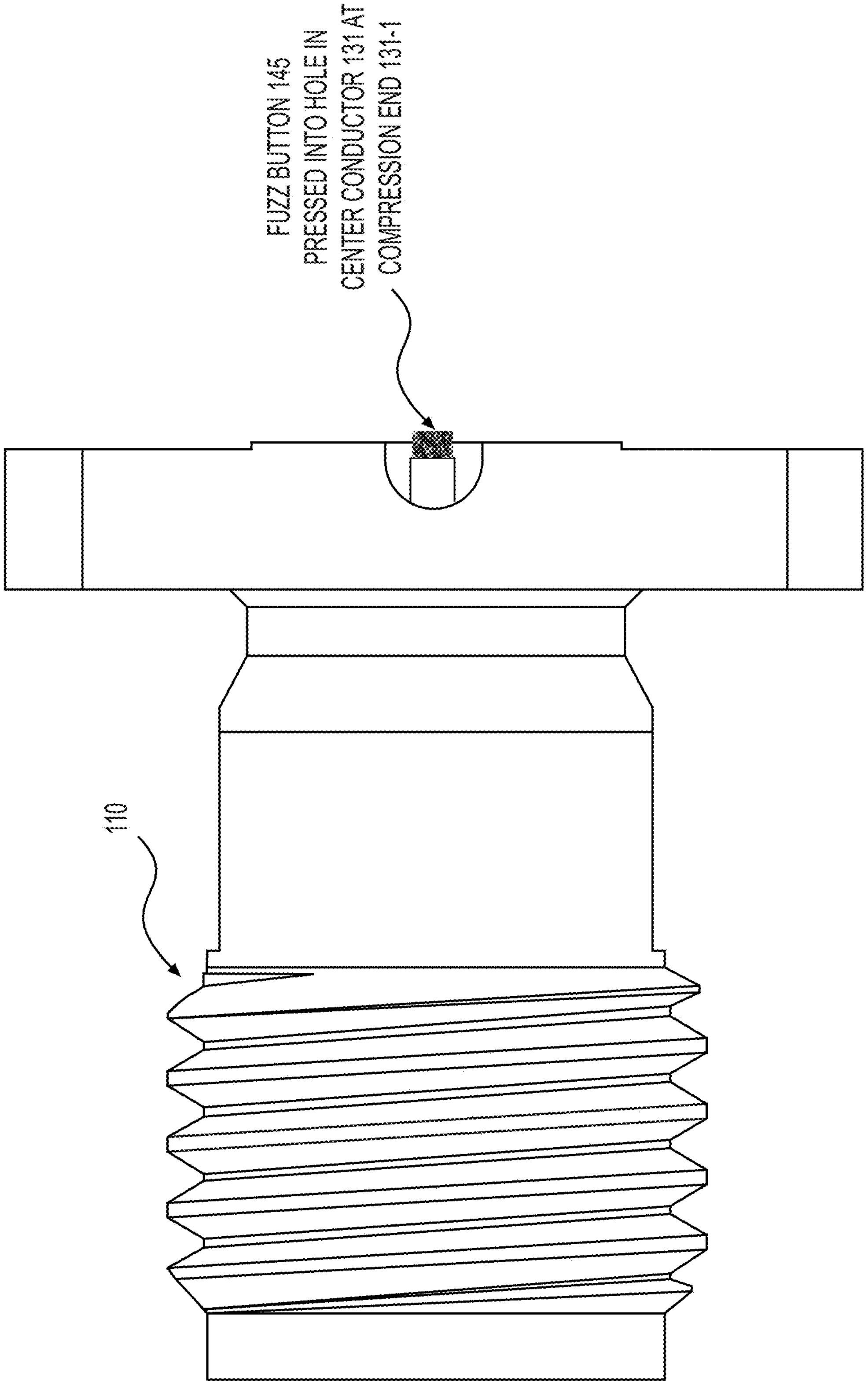
FIG. 28 is side view of a RF connector, such as a vertically mounted, RF compression connector with or without aligners, configured with a fuzz button.

FIGS. 18-20 show perspective and cross-sectional views of a core 130 that is insertable into the RF connector 110 or the connector housing 112 shown in FIG. 14. The core 130 can include a center conductor 131 that passes through the core 130 and can be configured to conduct signals. One end of the core 130 can include a connector interface pin 132, which can be defined by a recess in the center conductor 131. The connector interface pin 132 can receive a pin from a mating connector or cable, for example, a coaxial cable or an RF cable. Another end of the core 130 can include a compression end 131-1 of the center conductor 131. The compression end 131-1 can be formed from and be part of the center conductor 131. The compression end 131-1 can be formed from the center conductor 131, can be formed from an electrically conductive compressible or elastomeric material, can be or include a fuzz button 145 (FIG. 28), can define a pogo pin, or can define an electrically conductive structure, an elastomeric structure, or both an electrically conductive and an elastomeric structure other than a pogo pin. Fuzz buttons 145 (FIG. 28) are less expensive and less complex to make than pogo pins and are particularly useful in applications using a thin dielectric PCB with a thickness greater than zero and less than about 0.010 inch (0.254 mm). FIG. 28 is a side view of an RF connector 110 in which a fuzz button 145 or pogo pin can be pressed into a hole of the center conductor 131 at the compression end 131-1.

The center conductor 131 can be surrounded by one or both of a dielectric spacer 133 and a void space 134. The dielectric spacer 133 and the void space 134 can electrically isolate the center conductor 131 from a ground conductor 135. The dielectric spacer 133 and the void space 134 can be defined by a matrix or lattice structure. A structure of the dielectric spacer 133 and the void space 134 can be adjusted to provide predetermined characteristics, for example, a predetermined dielectric constant. The ground conductor 135 can surround the center conductor 131, and the ground conductor 135 can be at least partially surrounded by a shell 139. The shell 139 can be plastic or another non-electrically conductive material.

The ground conductor 135 can define both a connector ground 136 and a substrate ground 137 at different ends of the core 130, with the connector ground 136 and the substrate ground 137 being at least partially not covered by the shell 139. The connector ground 136 can be defined by a planar shape that is able to mate with a corresponding ground connection of a mating connector or cable. The substrate ground 137 can be defined by a planar shape that is able to mate with the ground plane 156 of the substrate 150. The substrate ground 137 can also include a core ground cut-out 138 in the substrate ground 137, as further discussed below with respect to FIG. 22.

Figure 21:
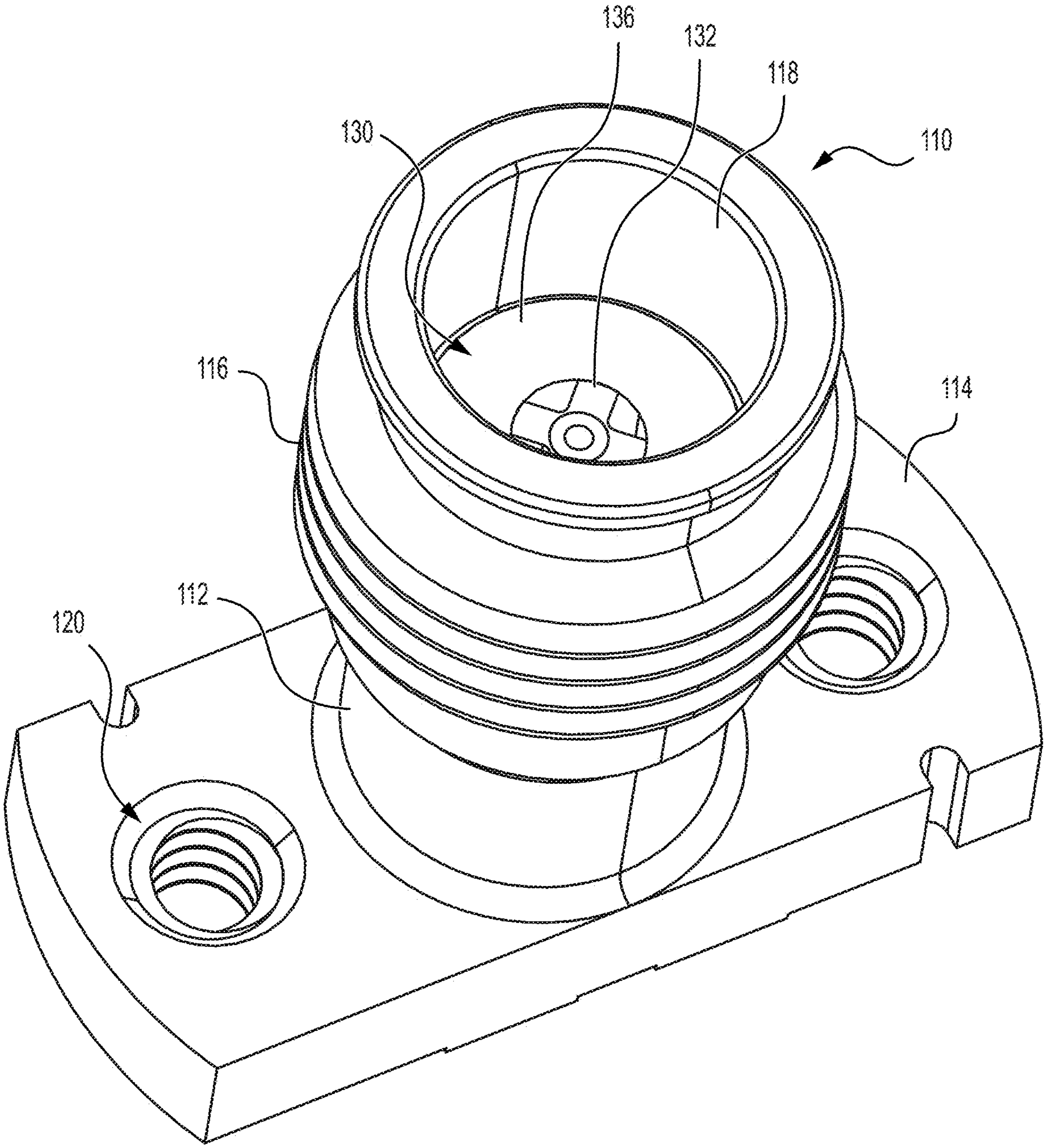
FIG. 21 is a perspective top view of the core shown in FIG. 18 inserted into the RF connector shown in FIG. 14.
Figure 22:
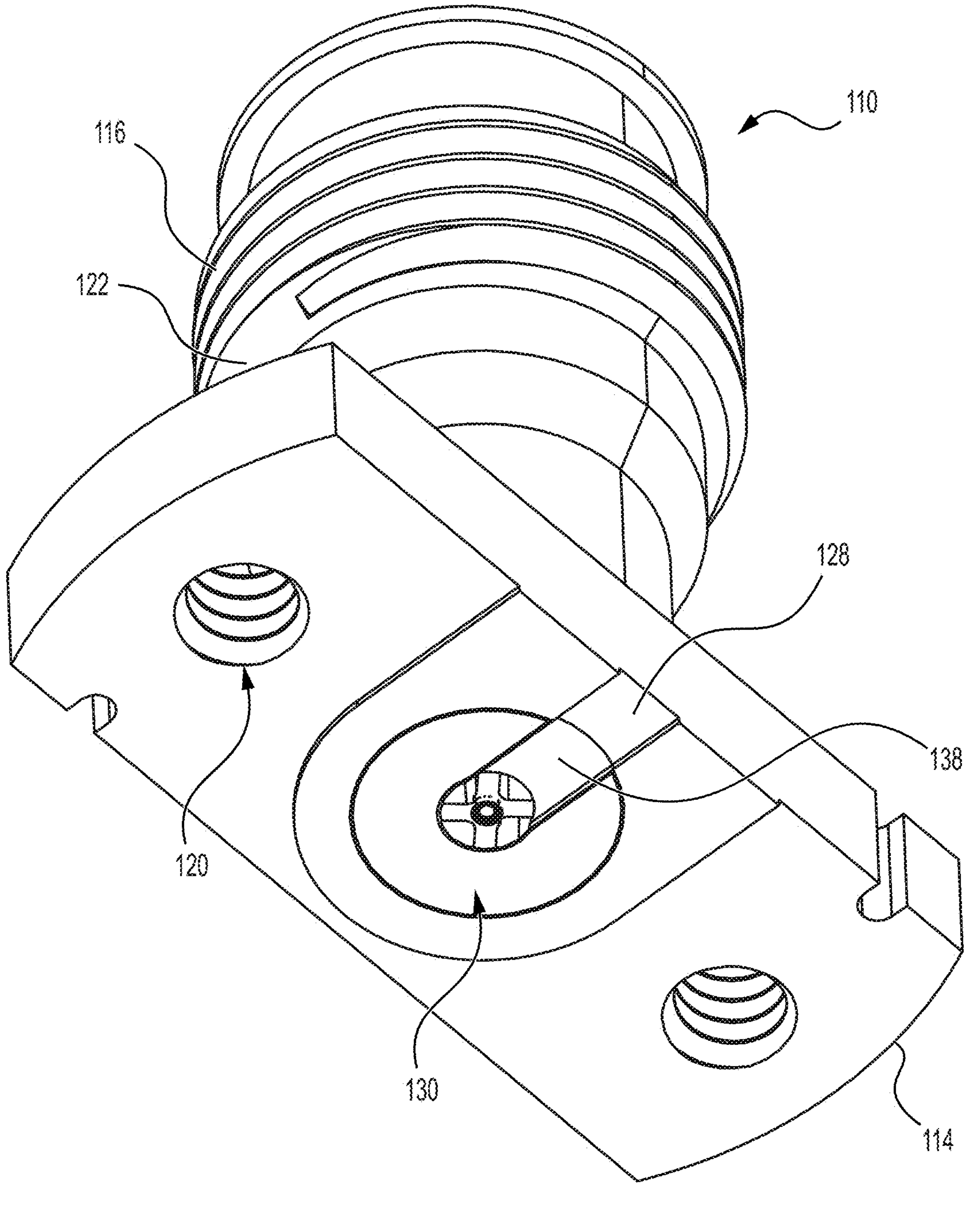
FIG. 22 is a perspective bottom view of the core shown in FIG. 18 inserted into the RF connector shown in FIG. 14.

As shown in FIG. 20, one or all of the center conductor 131, the dielectric spacer 133, the void space 134, and the ground conductor 135 can have a tapered shape along a length of the core 130. In particular, providing tapered shapes of the components in the core 130 can help to prevent reflectance. However, the shapes of the elements of the core 130 are not limited to those shown in the drawings and can be modified according to predetermined impedance characteristics and the like. One or more of the center conductor 131, the dielectric spacer 133, the ground conductor 135 and the shell can all be formed by an additive manufacturing process, for example, a three-dimensional printing process and/or a laser printing process. FIGS. 21 and 22 are perspective views of the core 130 shown in FIG. 18 inserted into the RF connector 110 shown in FIG. 14.

As shown in FIG. 21, the core 130 can be inserted into the RF connector 110 via the port 118, with the connector interface pin 132 and the connector ground 136 exposed in the port 118. Accordingly, a mating connector or cable can be electrically connected to the connector interface pin 132 and the connector ground 136 of the core 130, and the mating connector or cable can be physically secured to the RF connector 110 by the external threads 116. Thus, the RF connector 110 and the core 130 can define, but are not limited to, a vertically mounted, RF compression connector.

As shown in FIGS. 18 and 19, the core 130 can include a bevel 140 as an alignment feature. When the core 130 is inserted into the RF connector 110, the core can only be fully inserted into the RF connector 110 when the bevel 140 is aligned with the ridge 119 (shown in FIG. 16). The core 130 can be secured to the RF connector 110 by a press-fit connection, a press-fit and twist connection, an interference fit, glue, adhesive, or retention features provided on the shell 139.

As shown in FIG. 22, the RF connector 110 can further include a base ground cut-out 128, and the base ground cut-out 128 can be aligned with the core ground cut-out 138 when the core 130 is inserted into the RF connector 110. The core ground cut-out 138 and the base ground cut-out 128 provide a path for the signal trace 152 of the substrate 150 (as shown in FIGS. 14, 15, and 17).

At least a portion of the substrate ground 137 can include a roughened surface or stress concentrators, for example, bumps or pyramidal shapes formed on the substrate ground 137. The roughened surface or stress concentrators can provide improved conductivity between the substrate ground 137 and the ground plane 156 by providing multiple physical and electrical connections between the substrate ground 137 and the ground plane 156.

According to the structure of the RF connector 110 and the core 130, an electrical connector, such as an RF connector 110, can be provided that is able to be easily assembled, disassembled, and repaired. Further, since components of the core 130 can be made by an additive manufacturing process, the core 130 can be easily tuned or impedance matched for a predetermined application. The core 130 can also be easily removed and replaced by another core to perform maintenance or to provide different electrical characteristics.

Figure 23:
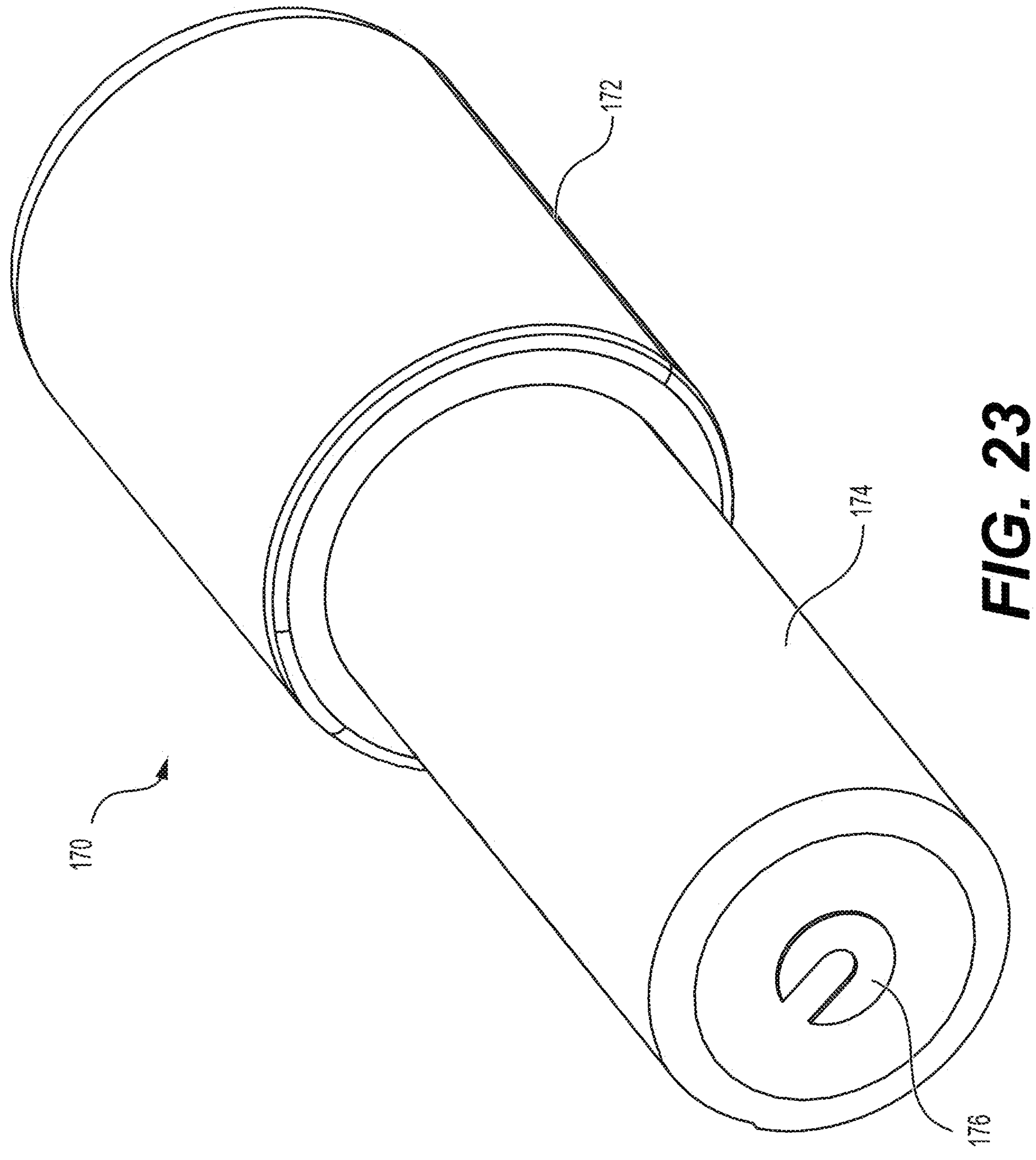
FIG. 23 is a perspective view of an alignment peg that is insertable into the RF connector shown in FIG. 14.
Figure 24:
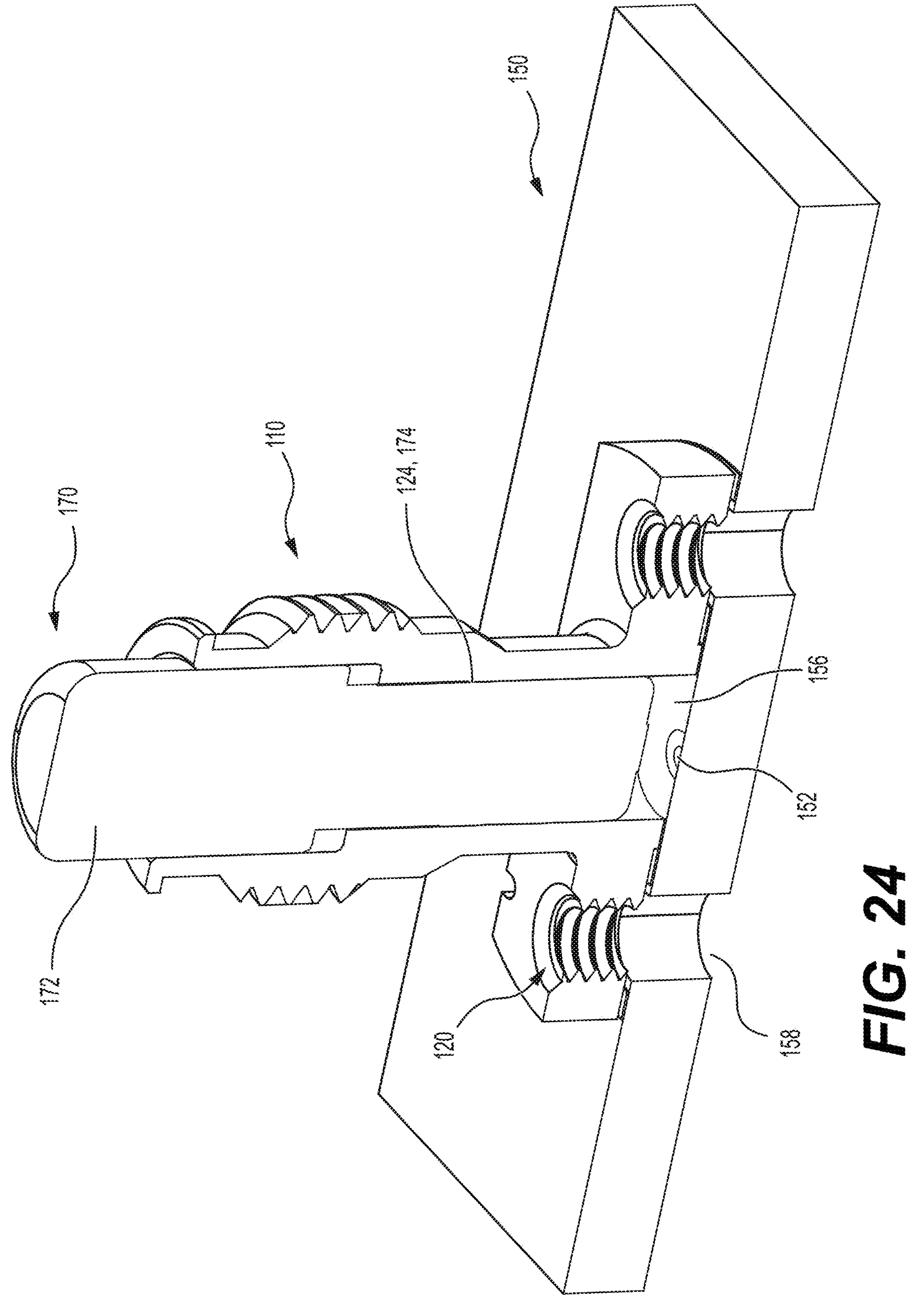
FIGS. 24 and 25 are top and bottom cross-sectional views of the alignment peg shown in FIG. 23 being inserted into the RF connector shown in FIG. 14.
Figure 25:
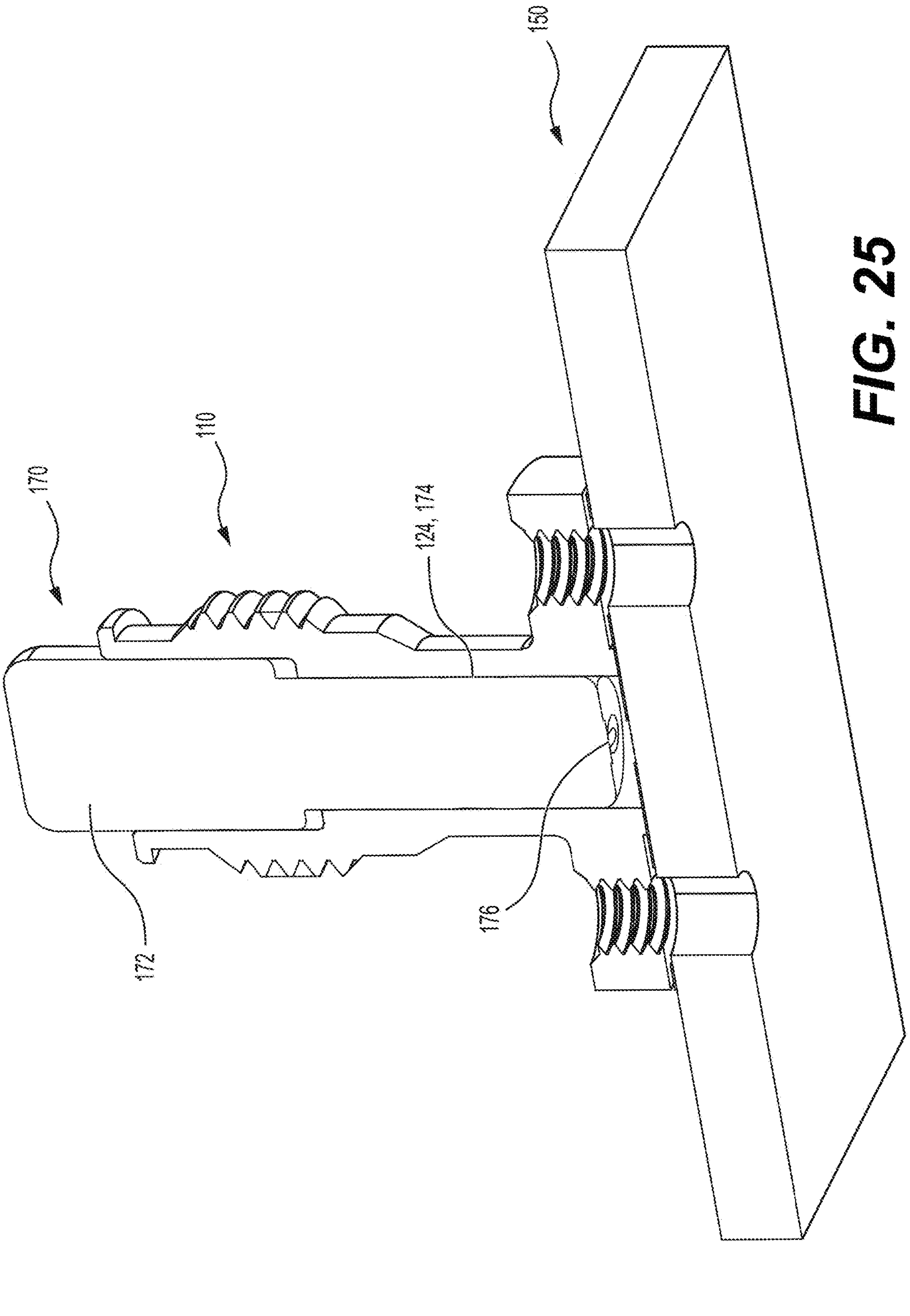

FIG. 23 is a perspective view of an alignment peg 170 that is insertable into the RF connector 110 or connector housing 112 shown in FIG. 14. FIGS. 24 and 25 are top and bottom cross-sectional views of the alignment peg 170 being inserted into the RF connector 110.

The alignment peg 170 can include a main body 172 and an embossed portion 176. The main body 172 can be made of plastic or a dielectric material and can include a shape that corresponds to an inner space of the connector base 114 of the RF connector 110. For example, the main body 172 can have a cylindrical or substantially cylindrical shape. The main body 172 can include a stepped portion 174 that defines, for example, two different width diameters in the main body 172. The stepped portion 172 of the alignment peg 170 can be provided to with a corresponding stepped portion 124 of the RF connector 110, as shown in FIGS. 24 and 25. The embossed portion 176 defines a protrusion from the main body 176 and can have a semi-circular shape or other shape that is able to mate with an anti-pad AP space between the signal trace 152 and the ground plane 156 of the substrate 150. That is, the raised embossed portion 176 is able to engage with traces on the substrate 150 and a space defined between the signal trace S and the anti-pad AP.

The alignment peg 170 can be made by an additive manufacturing process, for example, a three-dimensional printing process. Accordingly, a material of the alignment peg 170 is able to be deposited when manufacturing the alignment peg 170 by an additive manufacturing process. The embossed portion 176 can be provided in or on the alignment peg 170 by an additive manufacturing process or a laser printing process.

Figure 26:
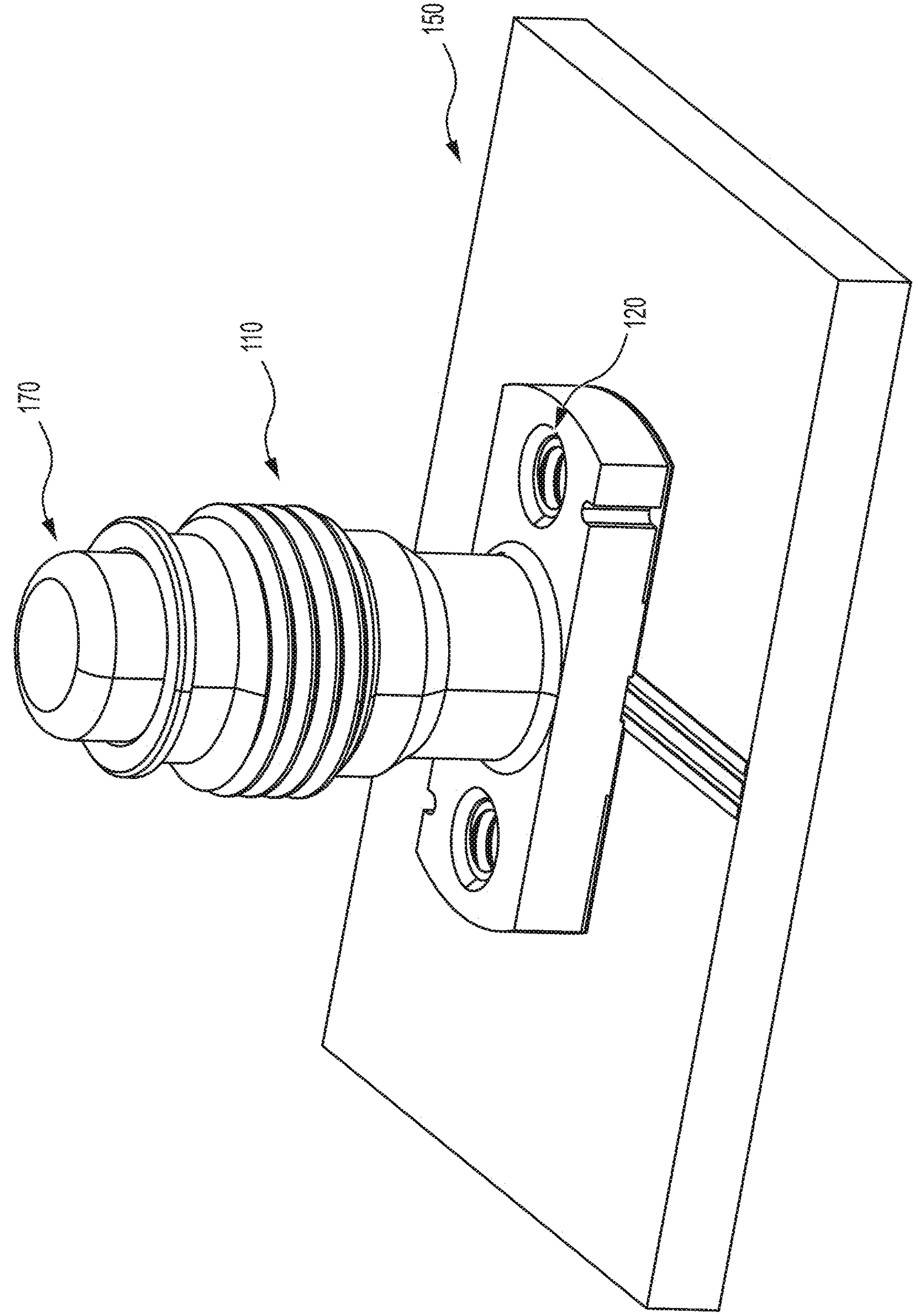
FIGS. 26 and 27 are top perspective views of the RF connector shown in FIG. 14 being mounted to the substrate shown in FIG. 14.
Figure 27:
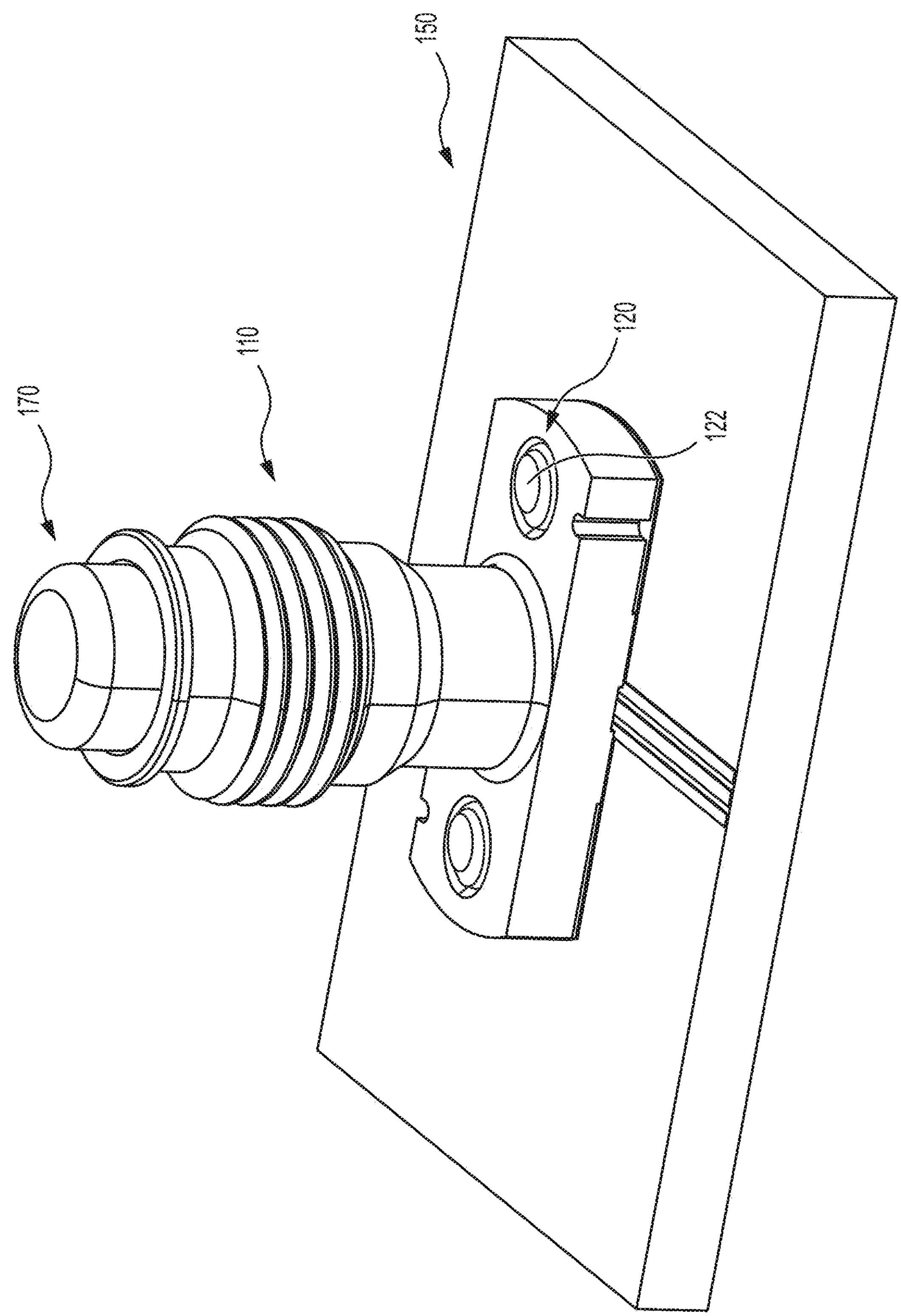

FIGS. 26 and 27 are top perspective views of the RF connector 110 being mounted to the substrate 150. The RF connector 110 is first placed on the substrate 150. For example, the RF connector 110 can be located on the substrate 10 so that the connector fastener holes 120 are aligned with the substrate fastener holes 158. As shown in FIG. 26, the alignment peg 170 is then inserted in the RF connector 110. The alignment peg 170 can include a length that is greater than a height of the RF connector 110 so that the alignment peg 170 protrudes from the RF connector 110 and is able to be easily grasped by a user or machine. The alignment peg 170 is then rotated until the embossed portion 176 engages with the traces on the substate 150, for example, the signal trace 152 and the ground plane 156. The embossed portion 176 can include a roughened surface to help remove (wipe) oxidation from the traces on the substate 150 when the alignment peg 170 is rotated.

As shown in FIG. 27, the screws 122 are then inserted through the substrate fastener holes 158 and into the connector fastener holes 120. With the alignment peg 170 in place to properly align the RF connector 110 to the substrate 150, the screws 122 can be tightened to secure the RF connector 110 to the substrate 150. The alignment peg 170 can then be removed and the core 130 inserted into the RF connector 110, as shown in FIGS. 21 and 22. Since the alignment peg 170 is able to align the RF connector 110 to the substrate 150, proper alignment between the center conductor 131 of the core 130 and the signal trace 152 of the substrate 150 can be provided.

Figure 29:
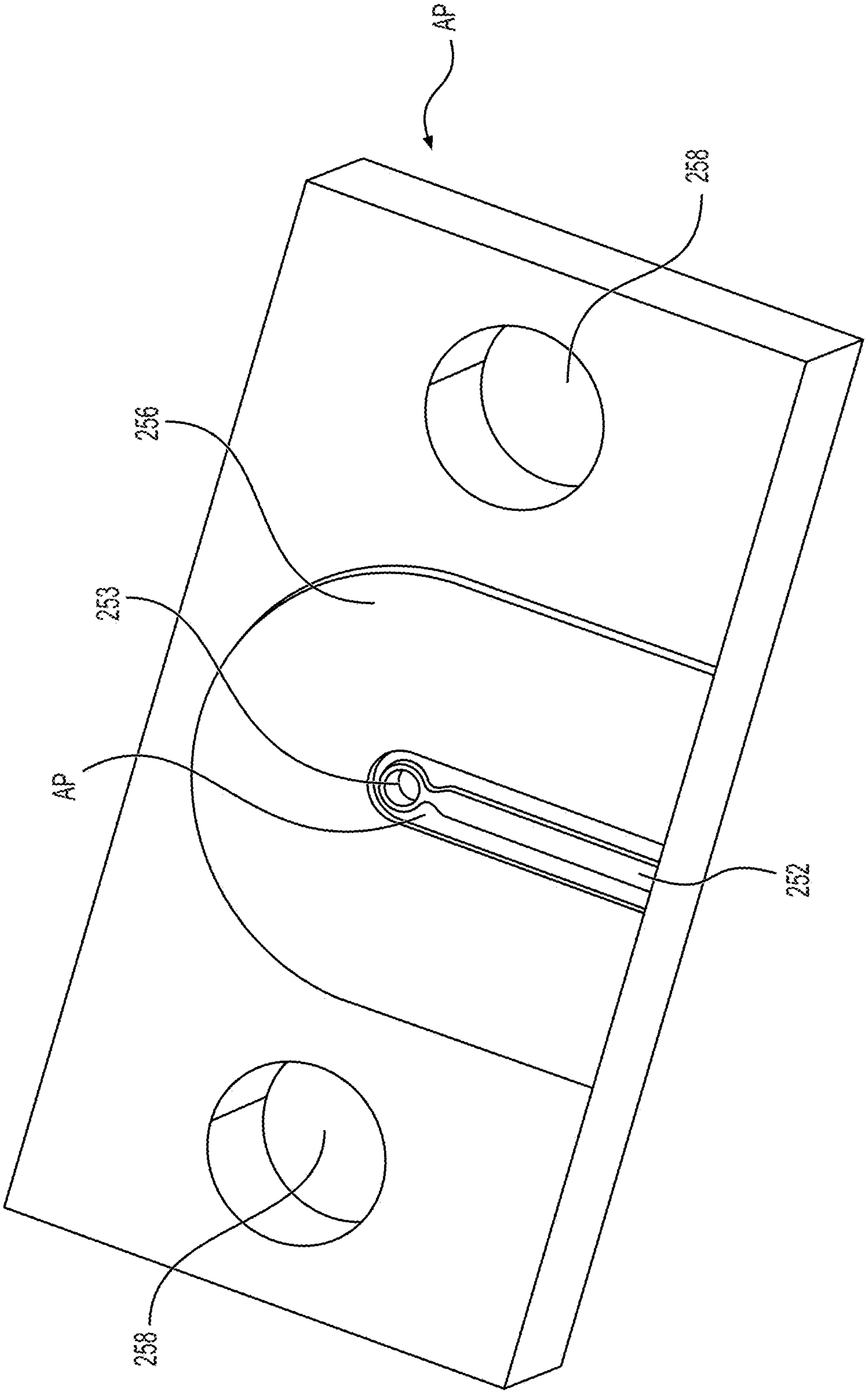
FIG. 29 is a perspective top view of another substrate.

FIGS. 29-33 show a substrate 250 upon which the RF compression connector 10 shown in FIG. 5, the RF connector 110 shown in FIG. 14, or an RF connector 210 (described below) can be mounted. FIG. 29 is a perspective top view of the substrate 250. As shown in FIG. 29, the substrate 250 can include substrate fastener holes 258, a signal trace 252, and a ground plane 256, similar to the substrate 150 shown in FIG. 17. An anti-pad AP space is provided between the signal trace 252 and the ground plane 256 of the substrate 250. The substrate 250 can also include ground traces, similar to the substrate 150 shown in FIG. 17.

In contrast to the substrate 150 shown in FIG. 17, the substrate 250 shown in FIG. 29 includes a contact hole 253 in the signal trace 252. The contact hole 253 can receive the fuzz button 34 of the RF compression connector 10 shown in FIG. 5, the fuzz button 134 of the RF connector 110 shown in FIG. 14, or any corresponding end of a conductor of a mating connector. The contact hole 253 can be centered, within manufacturing tolerances, on a signal pad of the substrate 250 that receives a mating conductor of a mating connector. The anti-pad AP can at least partially surround the contact hole 253 to define the portion of the signal trace 252 surrounding the contact hole 253 in a ring shape.

Figure 30:
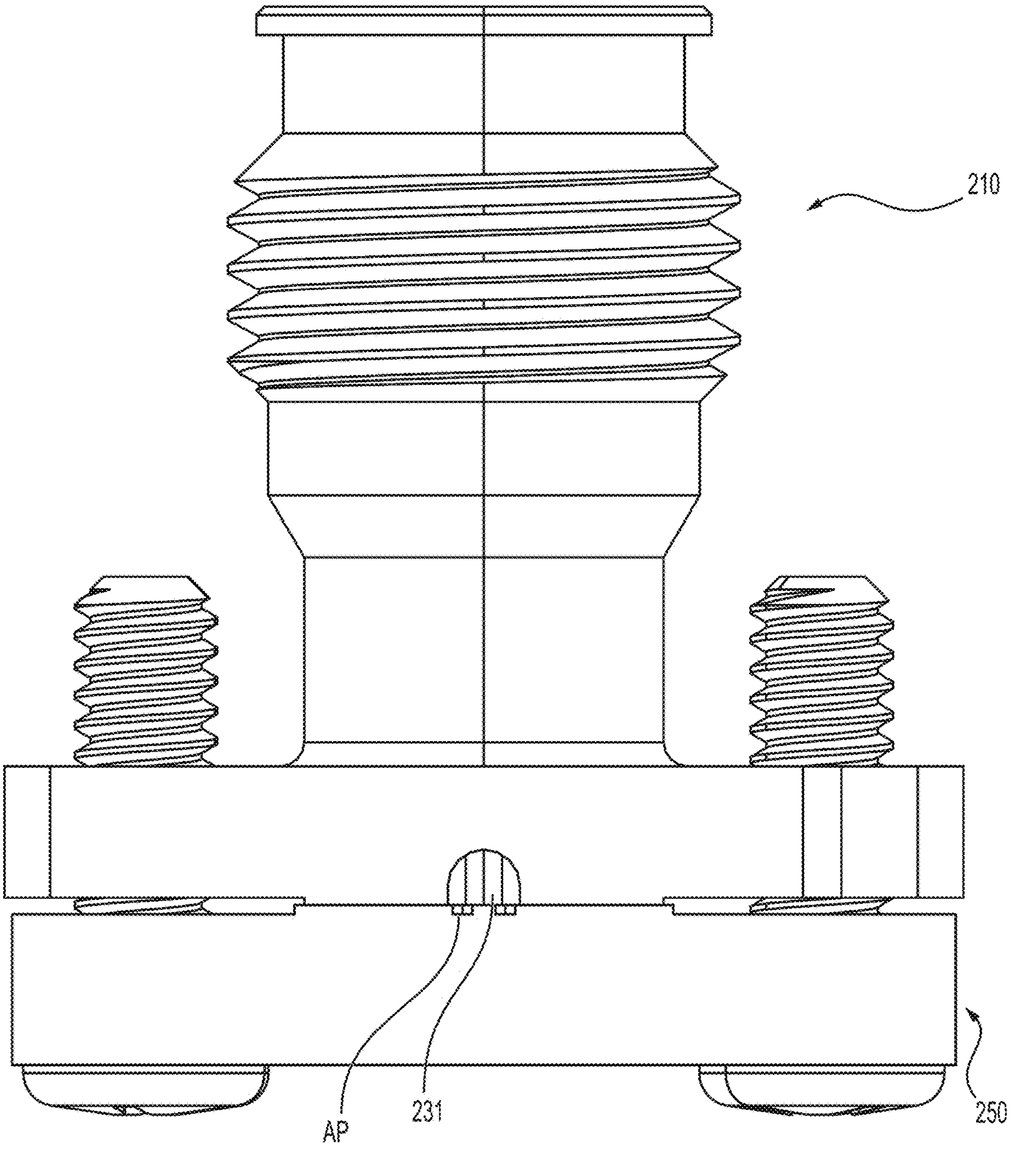
FIGS. 30 and 31 are side and cross-sectional views of another RF connector mounted to the substate shown in FIG. 29.
Figure 31:
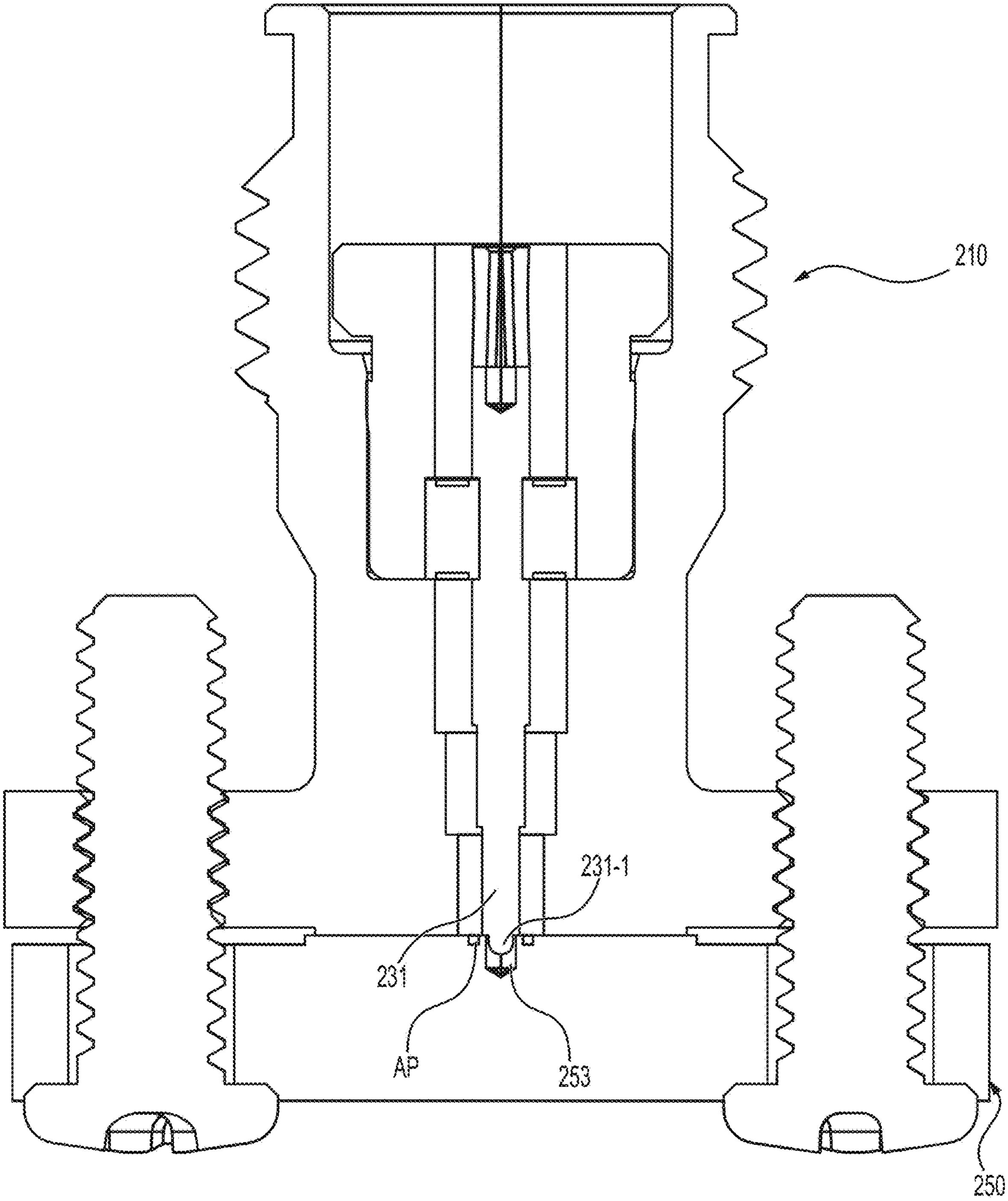
Figure 32:
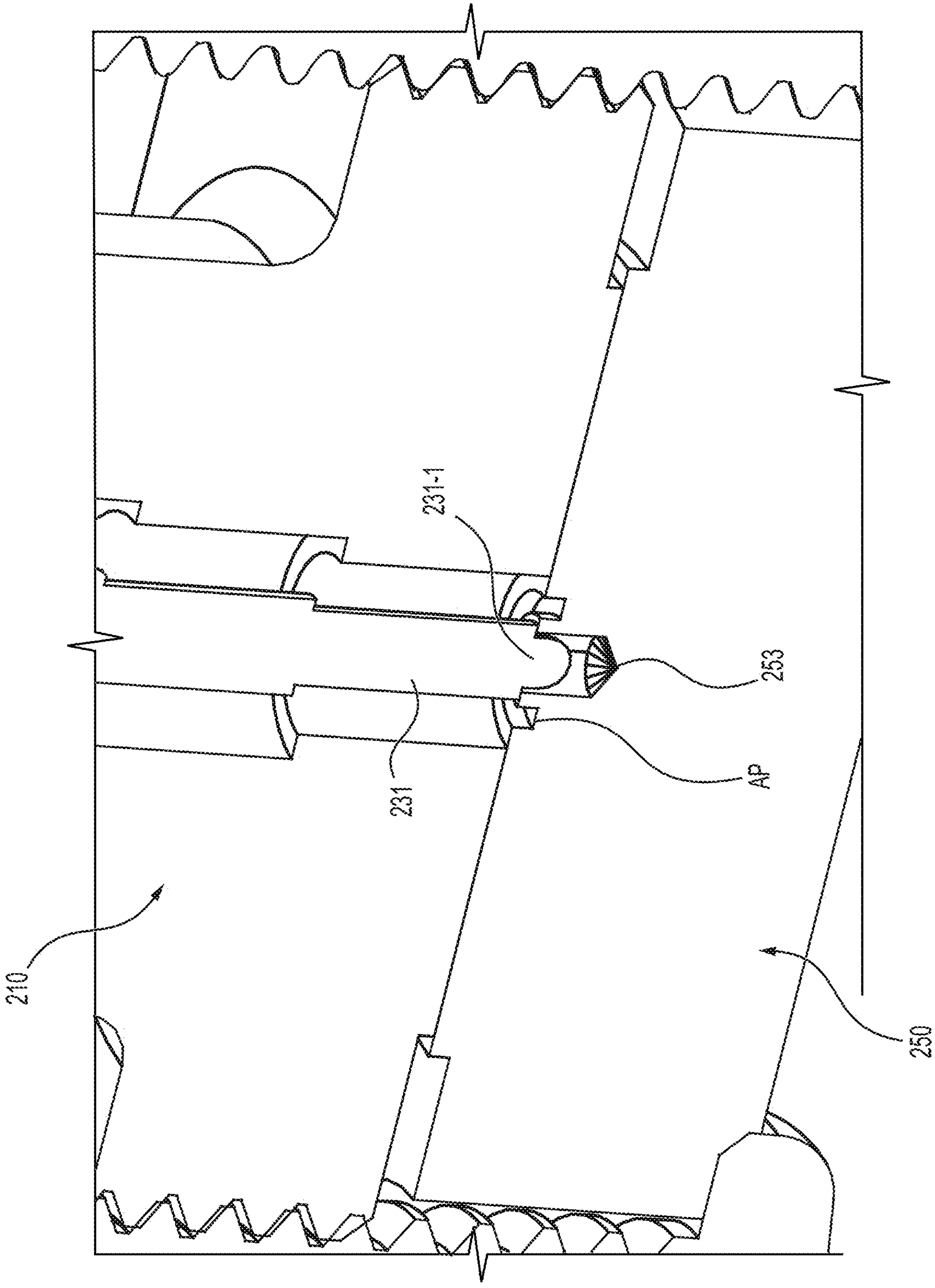
FIG. 32 is an enlarged view of the cross-section shown in FIG. 31.
Figure 33:
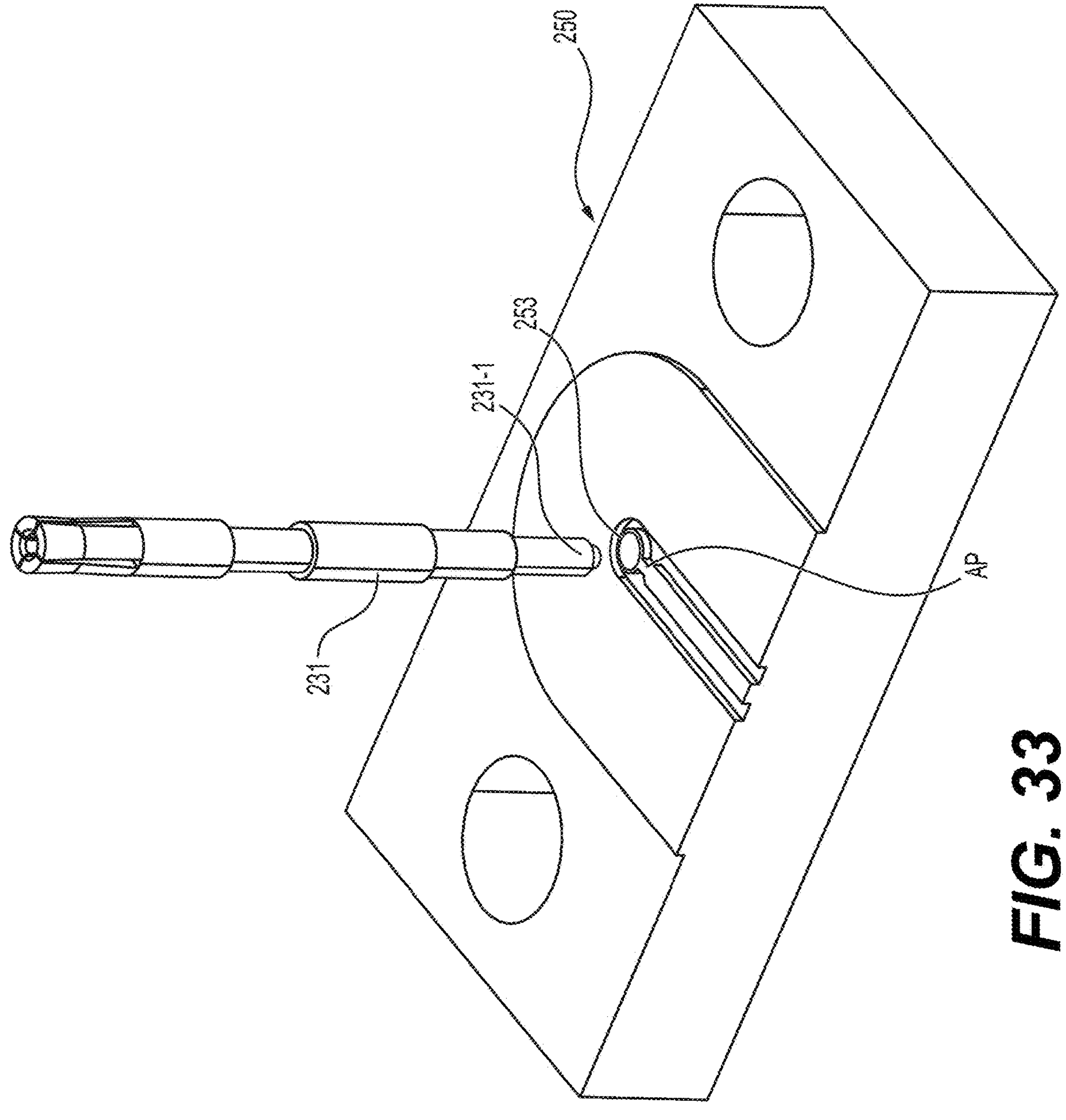
FIG. 33 is a top perspective view of a center conductor of the RF connector shown in FIGS. 30-32 being mounted to the substrate shown in FIG. 29.

FIGS. 30 and 31 are side and cross-sectional views of an RF connector 210 mounted to the substate 250. FIG. 32 is an enlarged view of the cross-section shown in FIG. 31. The RF connector 210 can include components similar to the RF compression connector 10 shown in FIG. 5 and/or the RF connector 110 shown in FIG. 14. As shown in FIGS. 31 and 32, the RF connector 210 can include a center conductor 231 with a probe tip 231-1 that protrudes from a base of the RF connector 210, and the probe tip 231-1 can be received by the contact hole 253 when the RF connector 210 is mounted to the substrate 250. The contact hole 253 can be formed to not extend fully through the substrate 250, as shown in FIGS. 31 and 32. Alternatively, the contact hole 253 is formed above the surface of the substrate 250 and does not extend into the substrate 250 at all. For example, the signal trace 252 and the anti-pad AP can be formed on the surface of the substrate 250, and the contact hole 253 can be formed in the signal trace 252 such that the contact hole 253 is above the surface of the substrate 250. Alternatively, the contact hole 253 can both extend above the surface of the substrate 250 and extend below the surface of the substrate 250.

According to the features described above, a user can tactically feel when the probe tip 231-1 is received by the contact hole 253 while mounting the RF connector 210 to the substrate 250. Accordingly, the user can be assured that an electrical connection is provided between the center conductor 231 of the RF connector 210 and the signal trace 252 of the substate 250 prior to the user securing the RF connector 210 to the substate 250 (for example, by tightening screws or applying another type of fastener to secure the RF connector 210 to the substate 250). In addition, the electrical connection provided by the probe tip 231-1 and the contact hole 253 ensures a reliable electrical connection even if the RF connector 210 moves during use, for example, due to repeated attachment of a cable or the like to the RF connector 21.

One or both of probe tip 231-1 and the contact hole 253 can partially deform or include keying features to further secure the probe tip 231-1 within the contact hole 253. The probe tip 231-1 can be formed with shapes other that the hemispherical shape shown in FIGS. 31-33. For example, the probe tip 231-1 can be formed with a tapered shape, a shape that includes a point at an end of probe tip 231-1, a pyramidal shape, and the like. The contact hole 253 can also be formed with other shapes, such as shapes that match a geometry of the corresponding probe tip 231-1.

As shown in FIG. 31, the center conductor 231 can have a tapered or stepped shape with a reduced diameter where the probe tip 231-1 can be received by the contact hole 253. By providing a reduced diameter at the point of contact between the center conductor 231 and the contact hole 253, high impedance (inductive) compensation can be provided for the low impedance that occurs at a surface of the substrate 250 where signals transfer to the substrate 250.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The terminology used herein is for the purpose of describing particular embodiments only and is not intended to be limiting of the disclosure. As used herein, the singular forms “a”, “an”, and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An electrical connector comprising:

a connector housing including a connector base; and a first conductor that is carried by the connector housing and that includes a compression end; wherein the connector base defines at least one aligner, other than a connector fastener hole, that is configured to cooperate with a corresponding fiducial to properly align the electrical connector on a mounting surface of a substrate;

the at least one aligner is an open-ended notch, a closed notch, a cutout, or a hole in the connector base.

2. The electrical connector of claim 1, wherein the connector base defines at least two aligners, neither of which is a connector fastener hole, that are each configured to cooperate with a corresponding fiducial to properly align the electrical connector on a mounting surface of a substrate.

3. The electrical connector of claim 2, wherein the at least two aligners are positioned only on a first side of the connector base, only on a second side of the connector base, or on both the first and the second sides of the connector base.

4. The electrical connector of claim 2, wherein each of the at least two aligners is an open-ended notch, a closed notch, a cutout, or a hole in the connector base.

5. The electrical connector of claim 1, wherein the connector base defines a grounding ring on a second base side of the connector base, and the grounding ring has a first material thickness.

6. The electrical connector of claim 5, wherein the first material thickness is less than a second material thickness of either a second part configured to be positioned on or removably positioned on a substrate.

7. The electrical connector of claim 5, further comprising a substrate, and wherein the first material thickness is less than a second material thickness of either a second part positioned on or removably positioned on the substrate or an exposed ground plane positioned on the substrate.

8. The electrical connector of claim 1, wherein the first conductor includes a coaxial or RF compression conductor.

9. The electrical connector of claim 1, wherein compression end includes a separate elastomeric material.

10. The electrical connector of claim 1, wherein the compression end includes a fuzz button.

11. The electrical connector of claim 1, wherein the connector housing includes an electrically conductive material.

12. The electrical connector of claim 1, wherein the first conductor includes an electrically conductive material.

13. The electrical connector of claim 1, wherein the connector base defines at least one connector fastener hole.

14. A vertically mounted RF compression connector comprising:

an electrical connector of claim 1;

a grounding ring carried by a second base side of the connector base; and at least one connector fastener hole defined by the connector base.

15. The vertically mounted RF compression connector of claim 14, wherein the compression end includes a pogo pin.

16. The vertically mounted RF compression connector of claim 14, wherein the compression end includes a fuzz button.

17. The electrical connector of claim 1, wherein the at least one aligner includes first and second aligners; and the first and the second aligners are located on opposite sides of an X-axis extending along a length of the connector base and/or a Y-axis extending along a width of the connector based.

18. An electrical connector comprising:

a connector housing including a connector base; and a first conductor that is carried by the connector housing and that includes a compression end; wherein the connector base defines at least one aligner, other than a connector fastener hole, that is configured to cooperate with a corresponding fiducial to properly align the electrical connector on a mounting surface of a substrate;

the at least one aligner is a recess, a concavity, or a cavity in the connector base, or a protrusion defined by the connector base.

19. The electrical connector of claim 18, wherein:

the connector base defines at least two aligners, neither of which is a connector fastener hole, that are each configured to cooperate with a corresponding fiducial to properly align the electrical connector on a mounting surface of a substrate; and each of the at least two aligners is a recess, a concavity, or a cavity in the connector base, or a protrusion defined by the connector base.

20. An electrical connector comprising:

a connector housing including a connector base; and a first conductor that is carried by the connector housing and that includes a compression end; wherein the connector base defines at least one aligner, other than a connector fastener hole, that is configured to cooperate with a corresponding fiducial to properly align the first conductor with a corresponding signal pad; and the at least one aligner is an open-ended notch, a closed notch, a recess, a cutout, a hole, a concavity, or a cavity in the connector base, or a protrusion defined by the connector base.

21. An electrical connector system, comprising:

the electrical connector of claim 5; and a substrate, wherein the first material thickness is less than a second material thickness of an exposed ground plane positioned on the substrate that is configured to electrically connect, physically connect, or both electrically and physically connect to the grounding ring.

* * * * *